J. J. ROBERTS & J. D. KEEN.
STATION INDICATOR AND ADVERTISER.
APPLICATION FILED AUG. 11, 1906.
1,051,162.
Patented Jan. 21, 1913.
8 SHEETS—SHEET 1.
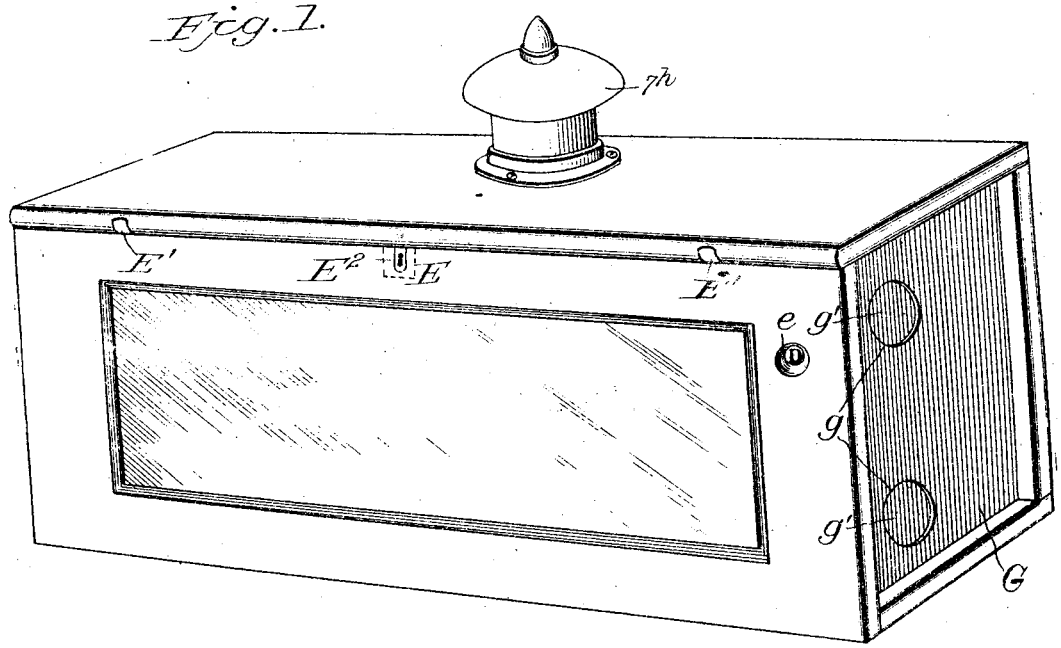
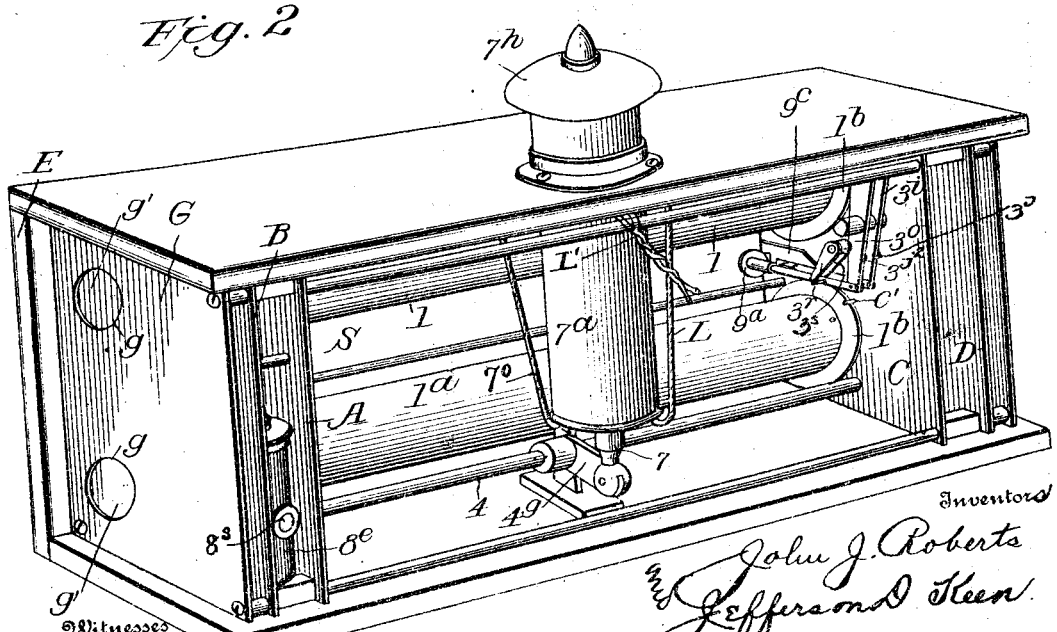

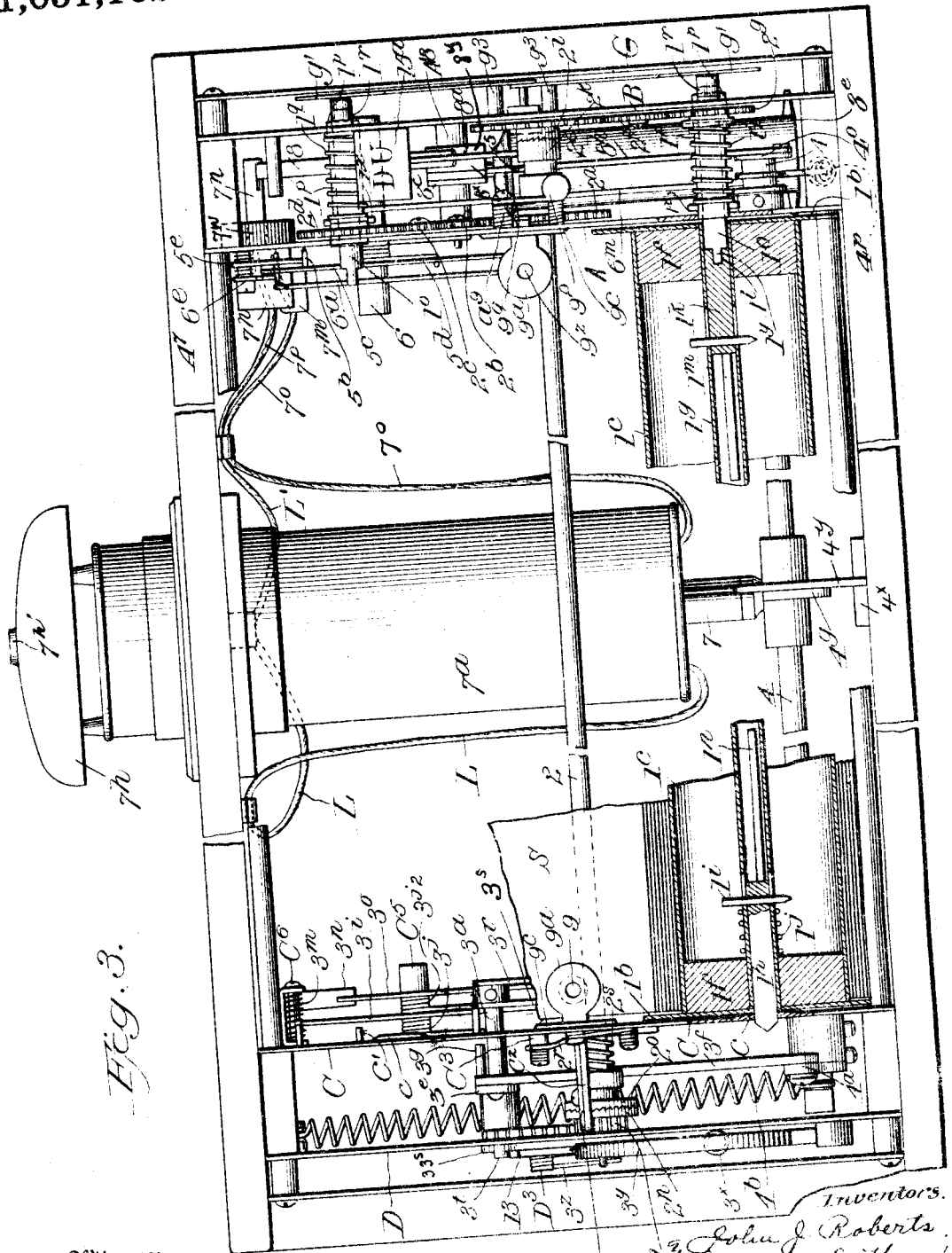

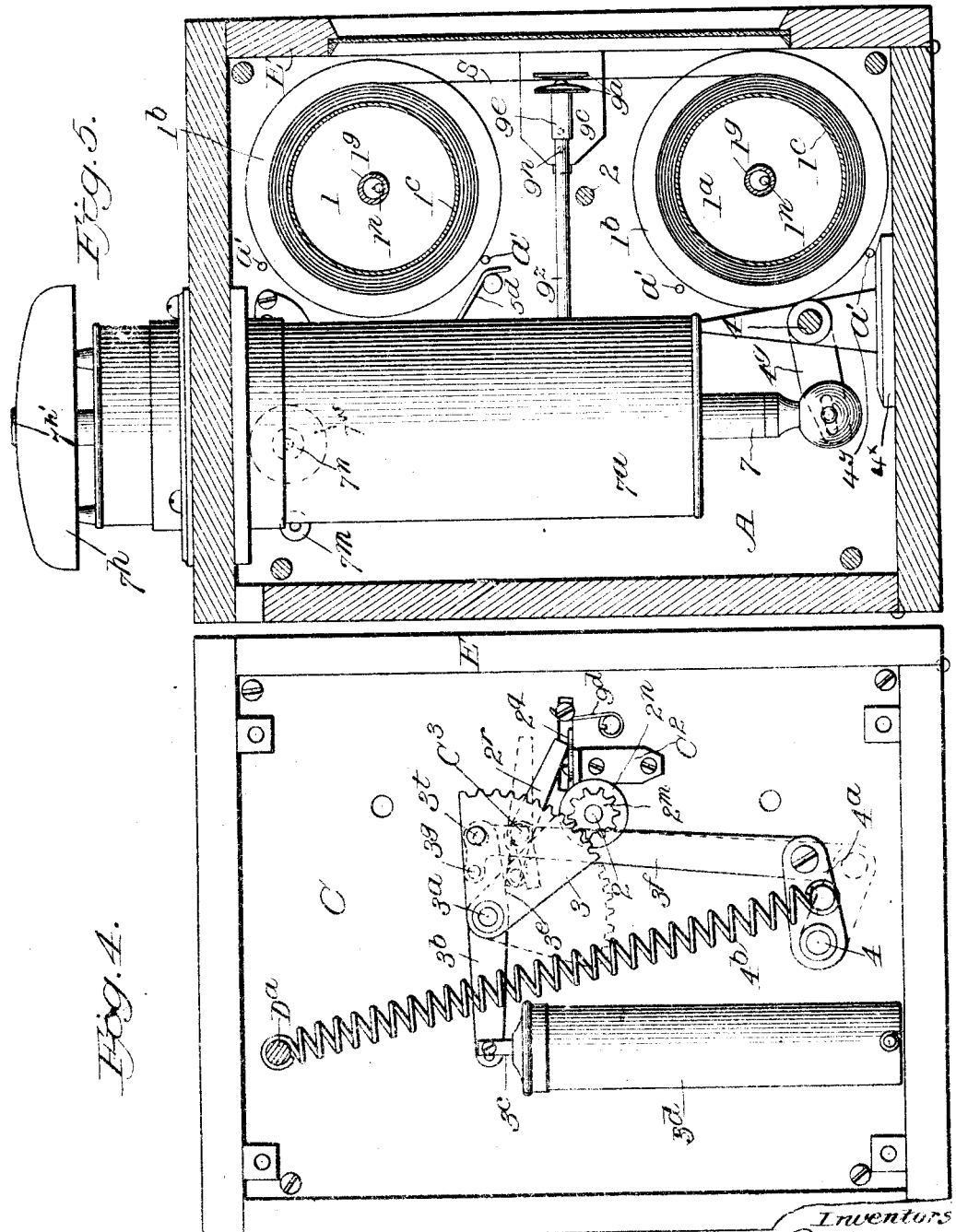

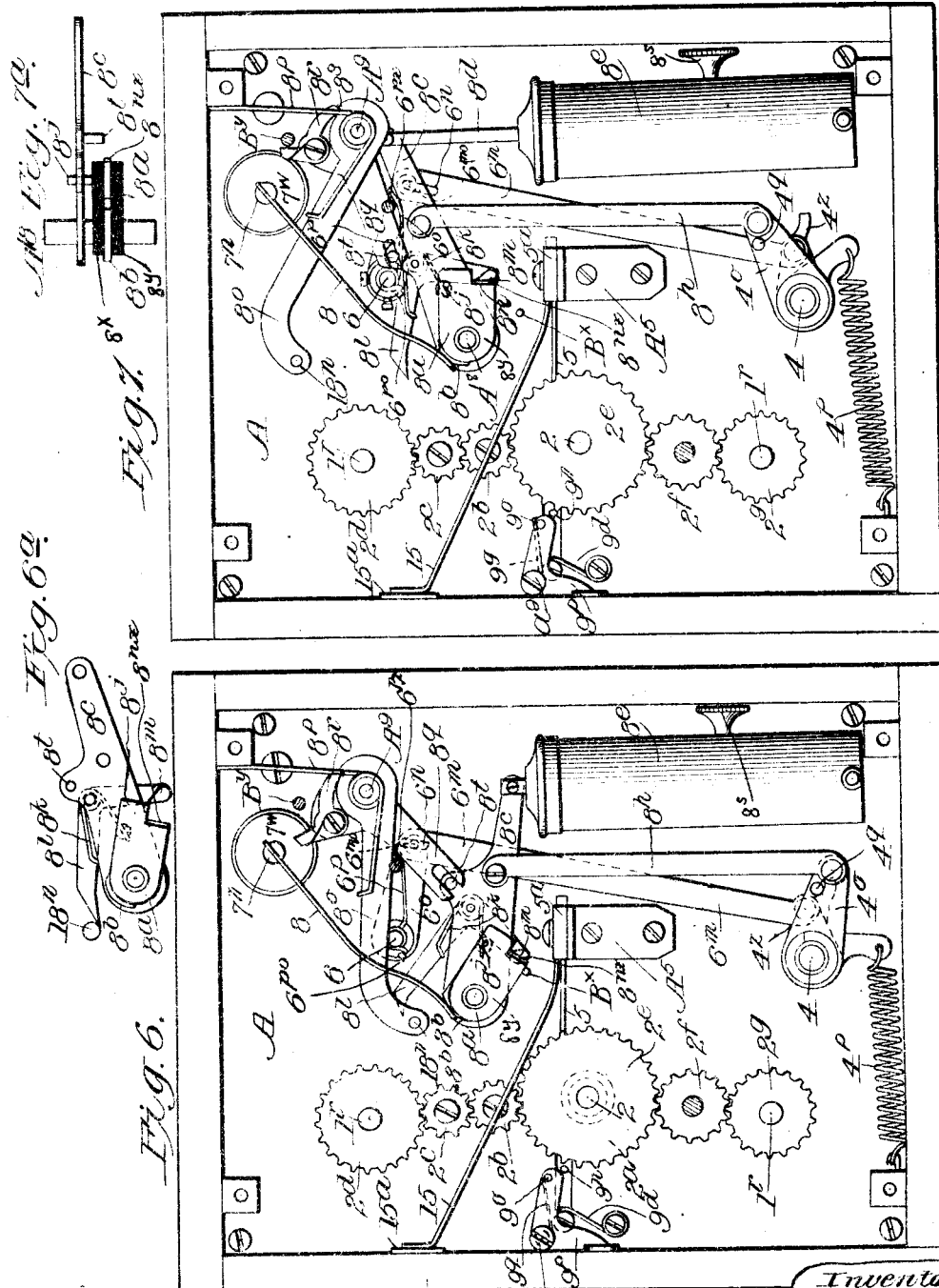

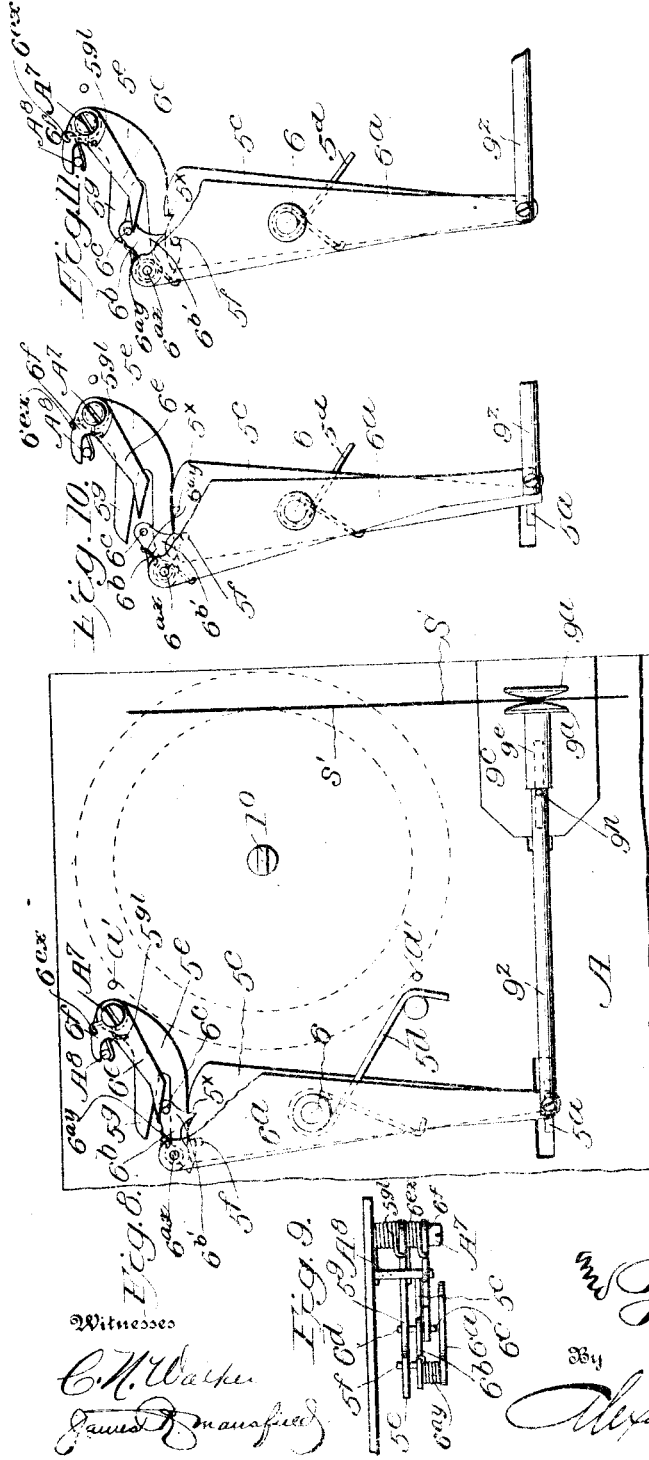
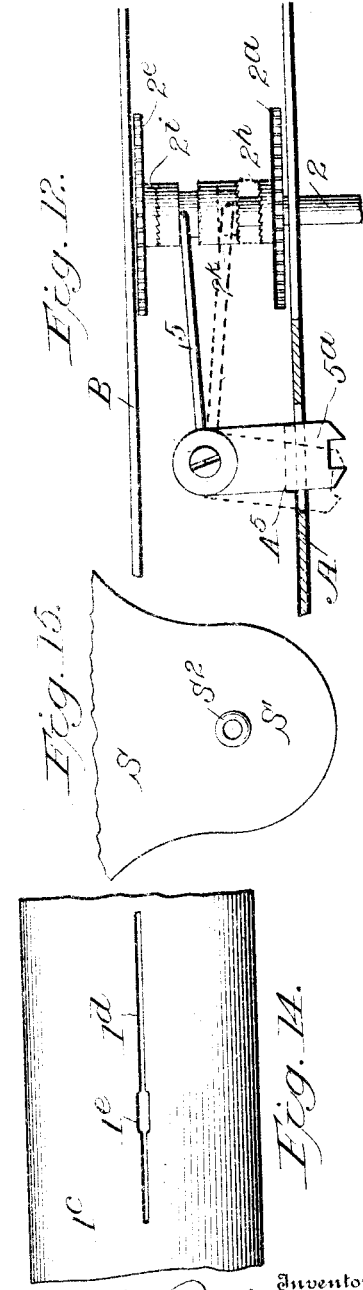

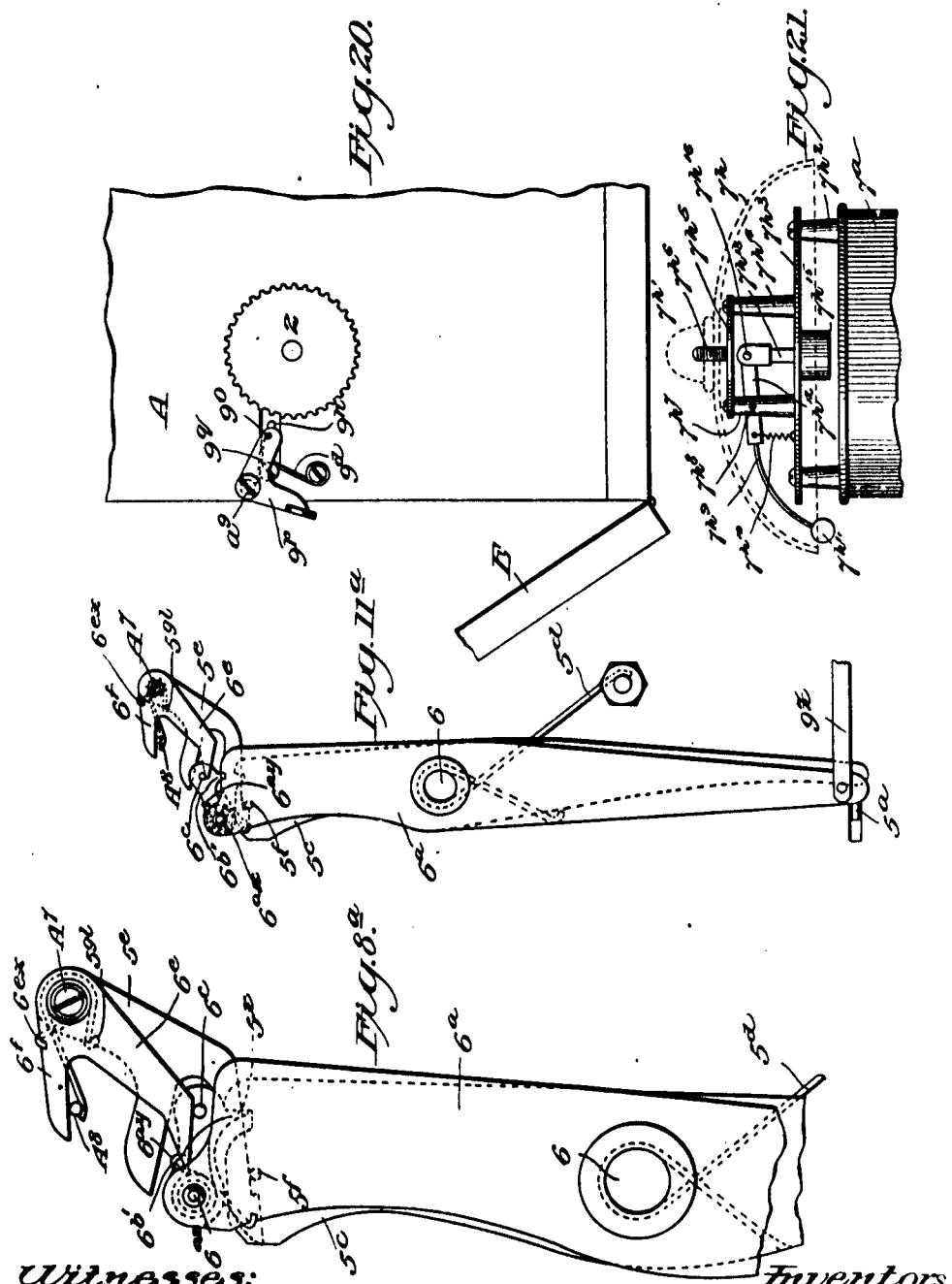

J. J. ROBERTS & J. D. KEEN.
STATION INDICATOR AND ADVERTISER.
APPLICATION FILED AUG. 11, 1906.
1,051,162.
Patented Jan. 21, 1913.
8 SHEETS—SHEET 7.
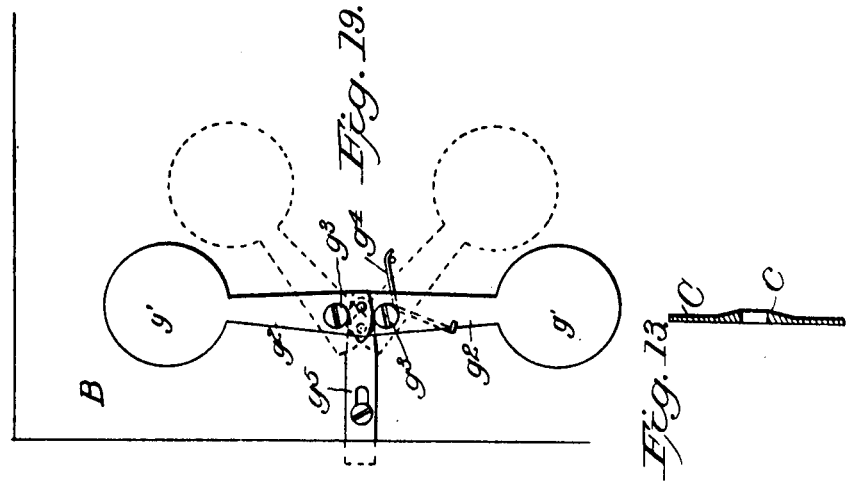
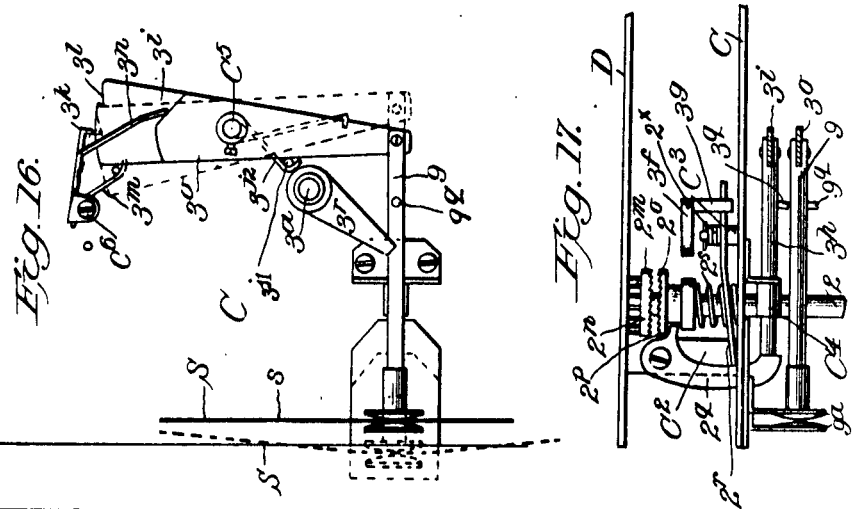
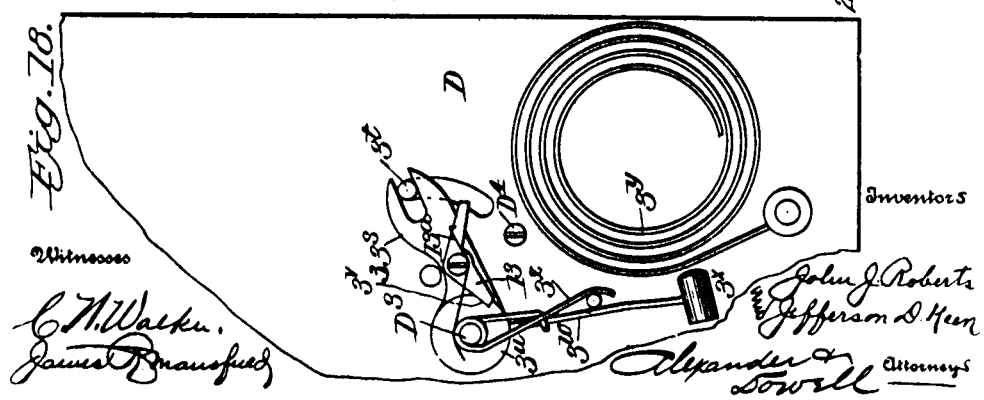

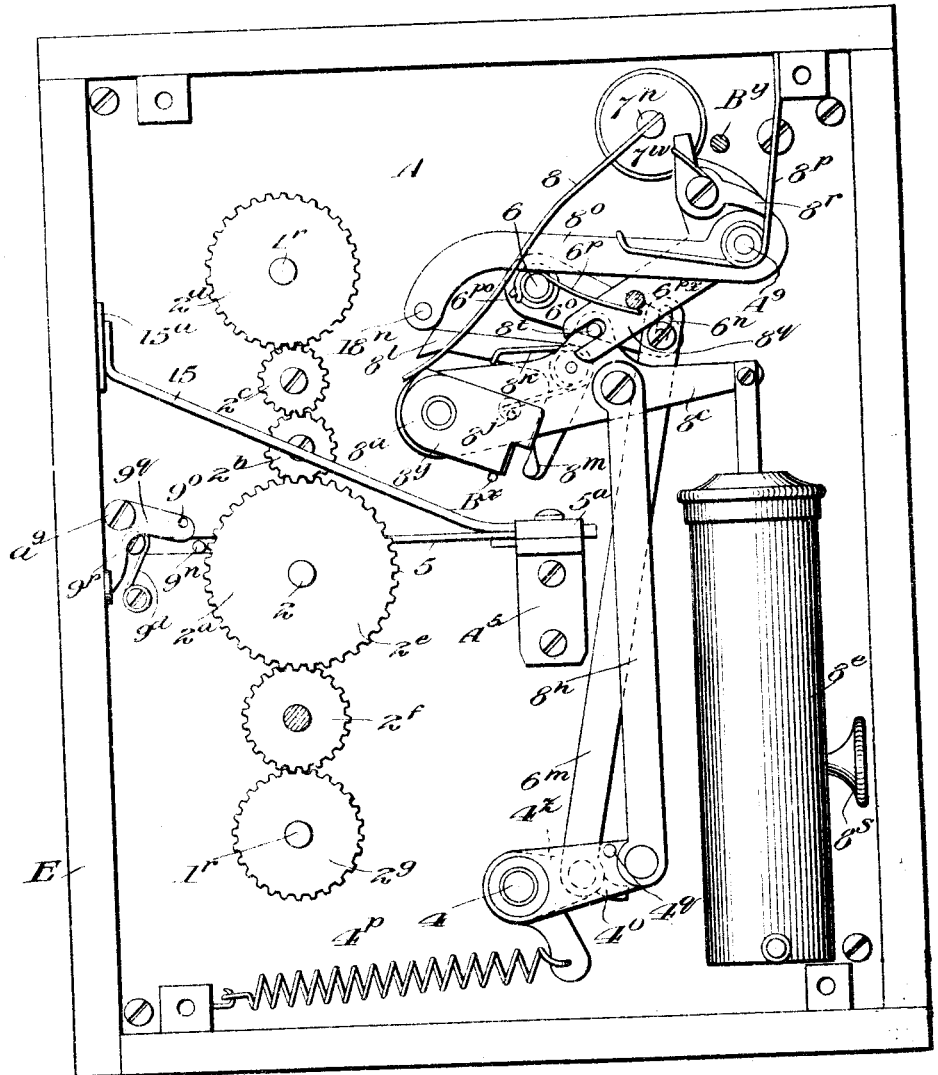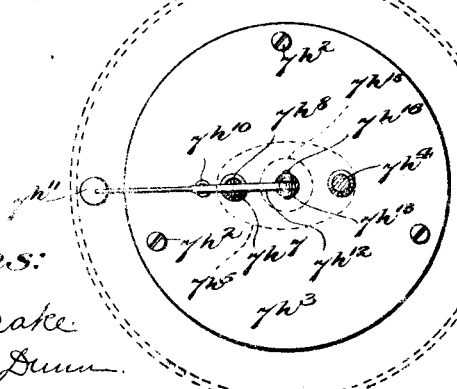

UNITED STATES PATENT OFFICE.

JOHN J. ROBERTS AND JEFFERSON D. KEEN, OF LOUISVILLE, KENTUCKY.

STATION-INDICATOR AND ADVERTISER.

1,051,162.  Specification of Letters Patent.  Patented Jan. 21, 1913

Application filed August 11, 1906. Serial No. 330,127.

*To all whom it may concern:*

Be it known that we, JOHN J. ROBERTS and JEFFERSON D. KEEN, citizens of the United States, and both residing at Louisville, Jefferson county, Kentucky, have invented certain new and useful Improvements in Station-Indicators and Advertisers; and we hereby declare that the following is a full, clear, and exact description thereof, reference being had to the accompanying drawings, which form a part of this specification.

This invention is an improvement in station indicators and advertising devices wherein a long strip or ribbon bearing the names of streets, or a number of advertisements, to be displayed in succession, is employed; and the object of our present invention is to produce a novel perfected mechanism of this nature adapted for use either as an indicator or an advertising display apparatus.

The objects of the invention are (1) to provide a novel construction of the ribbon rolls, whereby the same can be easily placed in or removed from the machine; (2) to provide novel means for driving either roll from the driving shaft and for releasing the rolls and shaft from the driving power when the proper amount of ribbon has been shifted past the sight opening; (3) to provide novel mechanism whereby the rolls are left free to be rotated in either direction at any time when the driving shaft is not positively actuating them; (4) to provide novel means whereby tampering with the rolls is prevented, when the casing of the apparatus is closed; (5) to provide novel means whereby when the casing is opened the ribbon is thrown clear of the several controlling-devices which ordinarily are in position to engage the margins of the ribbon; (6) to provide novel means for compensating for the gravitation factor in the indicator ribbon; (7) to provide novel means for automatically reversing the motion of the ribbon, so that the machine can operate continuously and indefinitely if desired; (8) to provide novel electro-magnetic devices for setting the shaft-driving mechanisms into operative condition; (9) to provide novel means for automatically making and breaking the electric circuit through the magnet; (10) to provide novel means for timing and regulating the action of the electro-magnet, so that the ribbon can be shifted at regular intervals as desired. All these objects are attained in the present invention, and the machine illustrated in the accompanying drawings is a practical apparatus embodying the aforesaid novel means, and other novel details of construction and combinations of parts which will be described in detail with reference to the drawings, and the operation of the various mechanisms will be explained in connection with each, so that the operation of the apparatus as a whole will be clearly comprehended, and the various novel features, parts and combinations of parts for which protection is desired, are summarized in the claims following the detailed description of said machine.

In the drawings—Figure 1 is a front perspective view of the complete indicator. Fig. 2 is a rear perspective thereof with the back removed. Fig. 3 shows fragmentally a front elevation of our station-indicator and advertising machine with the essential parts assembled in their relative places, but with the roller 1 removed and the roller $1^a$ showing in longitudinal section; while the following parts are omitted: parts $7^{h11}$ and $7^{h15}$, shown in Fig. 21, and also parts $3^b$, $3^c$ and $3^d$, shown in Fig. 4. Fig. 4 is an elevation of the driving shaft operative devices with the end plates removed. Fig. 5 is a transverse section showing the solenoid in elevation and the ribbon rolls in section. Figs. 6 and 7 are elevations of the roll-driving and controlling devices, and the electrical switch mechanism. Figs. $6^a$ and $7^a$ are details of parts shown in Figs. 6 and 7. Figs. 8, $8^a$, 9, 10, 11, $11^a$, and 12, are detail views of the shifting devices for the clutch controlling the direction of rotation of the ribbon-rolls. And specifically, Fig. 8 shows an elevation of Plate A with some of said shifting devices attached thereto in operative positions so that arm $5^c$ is about to move clutch $2^k$ into engagement with clutch-member $2^h$ to drive roll 1 positively. Fig. $8^a$ is a detail view of some of the parts shown in Fig. 8, as they appear in normally operative positions, after the arm $5^c$ has moved clutch $2^k$ into engagement with clutch-member $2^h$, to drive roll 1 positively. Fig. 9 is a horizontal projection showing the upper edges of arms $6^a$ and $5^c$ and some of their co-acting parts attached to Plate A. Fig. 10 is a side elevation of some of the shifting devices in Fig. 8, but in a position of operation just in advance of the position shown in Fig. 8. Arm 6ᵃ with rod 9ᶻ has gone forward its excessive distance, and dog pin 6ᶜ has just slipped down off cam 6ᵉ; and at the next stroke will pass underneath cam 6ᵉ. Fig. 11 is a side elevation of some of the parts shown in Fig. 10, but with said parts in their positions at the moment when dog-pin 6ᶜ is about to ride up on cam 6ᵉ to raise cam-finger 5ˢ so as to unlock catch 5ᵉ from the pin 5ᶠ so that arm 5ᶜ will move clutch 2ᵏ into mesh with clutch-member 2ˡ to operate roll 1ᵃ positively. Fig. 11ᵃ is a side elevation of the parts shown in Fig. 11, as they appear in normally operative position after catch 5ᵉ has been unlocked from pin 5ᶠ and arm 5ᶜ under the impulse of spring 5ᵈ has moved clutch 2ᵏ into mesh with companion-clutch 2ˡ, so that roll 1ᵃ may be operated positively. Fig. 12 is a horizontal projection of plates A and B and some of the shifting devices between them, showing how bell-crank lever 5—5ᵃ slides clutch 2ᵏ alternately into mesh with companion-clutches 2ˡ and 2ʰ, to operate positively, first, roll 1ᵃ, and then, roll 1. Fig. 13 is a detail view of one of the roll journal bearings. Figs. 14 and 15 are detail views showing the means for connecting the ribbon to the roll. Figs. 16 and 17 are detail views illustrating the mechanism controlling the clutch for throwing the driving shaft into and out of action. Fig. 18 is a detail of the alarm mechanism. Fig. 19 is a detail view showing the shutters g′, g′ and part of the mechanism for operating them. In this Fig. 19 the outside plate G has been left off and the dotted lines show the position of the shutters and co-acting parts when the front door of the casing is open. Fig. 20 is a side elevation of plate A, showing the front door E open and showing also a detail view of lever 9ᵖ and its co-acting parts in their normal positions when door E is open. Fig. 21 is a side elevation of the audible alarm mounted on solenoid 7ˢ, with the bell-gong 7ʰ and the ornamental nut 7ʰᵗ both removed. The dotted lines show the relative positions of said bell-gong and ornamental nut. Fig. 22 is a horizontal projection of said audible alarm mechanism, with bell-gong 7ʰ and ornament 7ʰᵗ and bridge 7ʰˢ all removed, the dotted lines showing the relative positions of said removed parts. Fig. 23 is a side elevation of some of the parts shown in Figs. 6 and 7, but on a larger scale and with the arm 8ᶜ half-way down, and the co-acting parts in their proper relative positions.

*The rolls.*—As both rolls are of exactly the same pattern and construction so that they are interchangeable in their operating positions, the detail description of one is intended to cover both.

In the drawings 1, 1ᵃ designate the upper and lower drums or rolls upon which the ribbon or strip of fabric S or other material is wound, upon which strip the indicia, such as street-names, or advertisements to be displayed, are printed, as usual. These rolls are provided with end-flanges 1ᵇ, to keep the ribbon in place during winding and unwinding; and have certain peculiar novel characteristics as follows:—Each roll is preferably constructed of a metal cylinder 1ᶜ, which has a central longitudinally disposed slot 1ᵈ, having an enlargement 1ᵉ, into which slot the end S′ of the ribbon S can be inserted, said ribbon having a projection or eyelet S² see Figs. 14 and 15 adapted to be inserted through the enlargement 1ᵉ of the slot, and then slipped laterally to one side of the enlargement, thereby securely but removably connecting the ribbon to the roll, as indicated in Figs. 14 and 15. The rolls, moreover, are provided with end blocks 1ᶠ see Fig. 3 within the cylinder, between which is arranged an axially disposed tube 1ᵍ, in one end of this tube is a longitudinally movable journal-pin 1ʰ, preferably having a cone-shaped outer end, and provided with a retaining pin 1ʲ projecting through slots in the tube 1ᵍ and pressed against by a spring 1ʲ, interposed between the pin and the adjacent end-block 1ᶠ so as to retract the journal-pin 1ʰ within the tube when the roll is not in place in the machine, so that it will not project beyond the end of the roll. In the other end of tube 1ᵍ is a sliding journal-seat 1ᵏ having its outer end slotted as at 1ˡ, and provided with a retaining pin 1ᵐ projecting through slots in tube 1ᵍ to prevent journal-seat 1ᵏ projecting out of the tube, and to limit its reciprocatory and rotating movement in the tube. A rod 1ⁿ is interposed between the pin 1ʰ and the seat 1ᵏ, so that when the seat 1ᵏ is pushed inward, journal-pin 1ʰ will be projected outward, and when journal-pin 1ʰ is retracted within the roll by spring 1ʲ, the seat 1ᵏ is forced outward to its place of rest flush with the end-flange 1ᵇ. When the roll is not in place in the machine, the journal-pin 1ʰ and the journal-seat 1ᵏ both lie within the tube or roll; but when the roll is put in position, the journal-seat 1ᵏ is pushed inward by means of a stub-shaft 1ᵒ, contained in a tubular sleeve 1ᵖ which is journaled in the upright plates A and B at the end of the frame. Stub-shaft 1ᵒ is also provided with a retaining pin 1ˣ projecting through slots in the sleeve, and is pushed inward by spring 1ᵗ, but can be drawn outward by a finger-piece 1ᶠ on its outer end, as shown. When the stub-shaft 1ᵒ engages journal-seat 1ᵏ it pushes the latter inward, and thereby through rod 1ⁿ forces journal-pin 1ʰ outward, so that the latter extends into engagement with a bearing in a side plate C at the opposite end of the machine. Said bearing is formed by an inwardly projecting cone c (see Fig. 13), to help seat the roll and to hold end-flange 1ᵇ away from plate C. The side plates A and C are provided, adjacent the bearings of the rolls 1 and 1ᵃ, with inwardly projecting pins a', c', against which the roll flanges 1ᵇ will contact when placing a roll in position, and thus center the roll in position to be mounted in its bearings. By drawing its stub-shaft 1° outward, either roll can be instantly disengaged from its bearings and easily removed. Thus the roll can be put in or out of position rapidly and easily without any endwise adjustment of the roll, and cannot be displaced except by first pulling stub-shaft 1° outward by hand, which action is resisted by spring 1ᵠ, which is sufficiently powerful to overcome spring 1ʲ; but as soon as shaft 1° is disengaged from journal-seat 1ᵏ, spring 1ʲ draws journal-pin 1ʰ into the roll, so that there are no projecting journals at either end of the roll, and by thus making the rolls with what we call disappearing journals the latter are protected from injury while the roll is out of the machine, and the removal and replacement of each roll is facilitated. The construction of the rolls forms one feature of the invention.

*The roll driving mechanism.*—Mechanism is provided for driving either roll 1, 1ᵃ, from the driving shaft, but only one roll is driven at a time, so that when one roll winds, the other trails unwinding. Mechanism is also provided so that both rolls are free of the driving mechanism, except during the time that they are being actually driven.

The roll 1 can be driven by gears 2ᵃ, 2ᵇ, 2ᶜ, 2ᵈ, see Figs. 3, 6, 7, from the driving shaft 2, while the roll 1ᵃ can be driven by gears 2ᵉ, 2ᶠ, 2ᵍ, from the same shaft. The gears 2ᵈ and 2ᵍ are respectively fast on the sleeves in which the stub-shafts 1° that engage the respective rolls 1, 1ᵃ, are mounted. The gears 2ᵃ and 2ᵉ, are both loose upon the shaft 2, are arranged adjacent to each other between the plates A, B, and are respectively provided on their opposed faces with clutch-members 2ʰ, 2ⁱ, see Fig. 12 adapted to be engaged by a sliding clutch-member 2ᵏ splined on shaft 2, and having its opposite ends adapted to engage the clutch-members 2ʰ, 2ⁱ, respectively, if moved into engagement therewith; and of course when locked to one gear the other is free, consequently but one roll 1, or 1ᵃ, can be positively driven at one time. Now shaft 2 as a driver rotates intermittently but always in the same direction actuated intermittently by the spring 4ᵇ, which exerts upon said driving shaft the same amount of force in each period of actuation (as will hereinafter be explained). But it is obvious that to wind the ribbon downward on roll 1ᵃ requires less work than to wind the ribbon upward on roll 1. And this difference in work considered in mechanics as the gravitation factor, amounts to twice the weight of that part of the ribbon between the rolls, multiplied by the distance of travel, where the radii of both rolls are equal; and in large machines of this type, this factor might necessitate a difference of fifty per cent. or more in the winding power of the two rolls, or enough to render such machines impracticable, without some means of compensation in the machines. And in all machines of this type large enough to make this gravitation factor considerable, we have found that the power required for winding the ribbon upward on roll 1, when applied to roll 1ᵃ for winding the ribbon downward, causes parts of the machine to move too rapidly and makes the ribbon go downward with a lunge instead of moving as it should. And this lunging movement of the ribbon downward not only interferes with the normal operation of the plungers 9 and 9ˣ, (hereinafter described), but it also gives roll 1, which is then trailing idle, a pull so quick and strong that, by the momentum thus acquired, roll 1 rotates too far detrimentally unwinding too much ribbon at a time. Compensation for this gravitation factor, therefore, was found to be necessary. To meet the conditions, then, a difference of torque-leverage in the two rolls was found to be practicable, as may be seen in the present model from which the submitted drawings were made. And in this model, the winding power required to wind the ribbon downward normally on roll 1ᵃ is about eighty-three per cent. of the winding power required to wind the ribbon upward normally on roll 1; and adequate compensation of this difference is effected in part by the perforated ribbon and its accessories in controlling the extent of roll movement (to be fully explained hereinafter), and in part by making the torque-leverage between driving shaft 2 and the surface of roll 1 different from the torque-leverage between driving shaft 2 and the surface of roll 1ᵃ, (to be fully explained hereinafter). While this might be done by making roll 1 of less diameter than roll 1ᵃ, or gear 2ᵃ of less diameter than gear 2ᵉ, we have preferred to make gear 2ᵉ larger than gear 2ᵍ (see Figs. 6 and 7). Thus roll 1ᵃ gets a less winding power than roll 1; and its corresponding excessive extent of roll-movement from one actuation of the spring 4ᵇ, is cut short and compensated in the operation of the perforated ribbon and its accessories in controlling the extent of ribbon movement at each actuation of the spring 4ᵇ (as will be fully explained hereafter). Therefore, the ribbon and its accessories above mentioned in combination with the difference in said torque-leverage, constitute a complete means in the machine of compensating for gravitation factor of the ribbon. Owing to the difference of one idle gear wheel in the gear-trains to roll 1 and 1ᵃ from shaft 2, roll 1 and 1ᵃ would be driven in opposite directions, from shaft 2, which rotates always in one direction. Mechanism is provided whereby the clutch-member 2ᵏ can be shifted into engagement with either clutch-member 2ʰ or 2ⁱ, and whereby it can be automatically shifted so as to reverse the winding of the ribbon S,—these mechanisms we will explain hereafter.

*The means for operating the driving shaft 2.*—On the end of shaft 2, see Figs. 3, 17, adjacent plate C, is a loose pinion 2ᵐ provided with a clutch-member 2ⁿ, opposite a sliding clutch-member 2° splined on shaft 2, and normally pressed toward member 2ⁿ by a spring 2ˢ. The clutch-member 2° is held out of engagement, normally, with member 2ⁿ by means of a finger 2ᵖ on a lever 2ᵠ, pivoted on a bracket C² attached to plate C, said finger 2ᵖ engaging an annular groove in the clutch-member as shown. The long arm of lever 2ᵠ passes through a slot in plate C, and past a dog 2ʳ pivoted on a stud C³ on plate C, and controlled by a spring 2ˣ which normally holds the dog in position to engage lever 2ᵠ and hold it in such position that clutch-member 2° is kept out of engagement with clutch-member 2ⁿ, consequently the shaft 2 is free of the driving means until the clutch-members are engaged. The pinion 2ᵐ meshes with a segment 3, see Fig. 4, fixed on a rock-shaft 3ᵃ which is provided with an arm 3ᵇ connected to a plunger 3ᶜ working in an oil dash-pot 3ᵈ of ordinary construction, adapted to regulate the movement of the segment 3. And said rock-shaft is also provided with an arm 3ᵉ connected by a link 3ᶠ to an arm 4ᵃ on a main or setting shaft 4 which is journaled in the end plates A and C as shown, and said arm 4ᵃ is, moreover, connected to one end of a stout helical spring 4ᵇ, the other end of which is fast to a pin Dᵃ on plate D. When the shaft 4 is rocked in the direction to tension spring 4ᵇ, segment 3 turns the pinion 2ᵐ idly on shaft 2, but just as the segment about reaches the limit of its downward, or setting, stroke, a pin 3ᵍ on link 3ᶠ, strikes the tail of dog 2ʳ and causes it to release lever 2ᵠ, whereupon spring 2ˢ throws clutch-member 2° into engagement with clutch-member 2ⁿ thus locking the pinion 2ᵐ to shaft 2, and consequently when the segment 3 makes its return movement under the impulse of spring 4ᵇ, the shaft 2 will be rotated, and the roll 1, or 1ᵃ (whichever is then geared up to shaft 2), will be rotated a certain extent. About the end of the return spring-actuated movement of the segment 3 (and the end of each roll-driving operation) the clutch-member 2° is automatically disengaged from member 2ⁿ and locked open by dog 2ʳ; the disengagement of the clutch is effected by the following devices: To the inner side of plate C see Figs. 3, 16, 17 is attached a guide C⁴ in which plays a rod 3ʰ pivotally connected at its rear end to the lower end of an oscillating lever 3ⁱ pivoted on a stud C⁵ attached to plate C, and provided with a controlling spring 3ʲ which normally acts to throw the lower end of the lever forward, and push rod 3ʰ forward into engagement with the end of lever 2ᵠ. In the plate C, near shaft 3ᵃ, is fixed a post 3ʲ¹, against which is braced a spring 3ʲ² coiled around C⁵, adapted to actuate arm 3° in one direction (Fig. 16). The lever 3ⁱ is locked, when the rod 3ʰ is retracted, by a dog 3ᵏ pivoted on a stud C⁶ on plate C above the lever and having a tooth adapted to engage a notch 3ˡ in the rounded upper end of lever 3ⁱ as shown, said dog being pressed into engaging position by a spring 3ᵐ. The dog is caused to automatically release lever 3ⁱ at the proper moment by the following devices,—(which form part of the sheet controlling and guiding devices hereinafter described:) Pivoted on stud C⁵ beside lever 3ⁱ, is a second lever 3° whose upper end is cam-shaped and adapted to engage a depending finger 3ⁿ on dog 3ᵏ, so as to cause the dog to release lever 3ⁱ when lever 3° makes a predetermined extent of movement, (controlled by the ribbon as hereinafter explained.) The lower end of lever 3° is pivotally connected to a rod 9 lying beside and parallel with rod 3ʰ. Rod 9 we will hereinafter describe in connection with the sheet-controlling and guiding devices. The rods 3ʰ and 9 are provided with pins 3ᵠ, 9ᵠ, which are adapted to be engaged by arms 3ˢ, 3ʳ on rock-shaft 3ᵃ, and when the segment 3 is rocked so as to tension spring 4ᵇ, the rods 3ʰ and 9 are drawn backward, this action leaves the clutch-member 2° under the control of dog 2ʳ, and as soon as the dog is tripped by pin 3ᵍ, as described, spring 2ˢ, will close the clutch 2° and thus shaft 2 will be operated by the segment. When rod 3ʰ is drawn backward, it is locked by the engagement of dog 3ᵏ, with lever 3ⁱ, but the lever 3° moves forward as fast as the arm 3ʳ will allow it, until its forward end reaches the ribbon S, which arrests its further forward movement until the arrival of an opening s in the ribbon S, through which rod 9 at once plunges, allowing arm 3° to complete its predetermined forward movement, then its cam-shaped upper end trips the dog 3ᵏ and releases rod 3ʰ which springs forward, striking the end of lever 2ᵠ disengaging clutch-member 2° from member 2ⁿ, and thus freeing the shaft 2 from the action of spring 4ᵇ, and the segment, and so cutting off the motive-power from the rolls 1, or 1ᵃ, until the shaft 4 is again rocked to put spring 4ᵇ under tension as above described. By this arrangement it will be noted that the clutch-member 2⁰ is both engaged and disengaged quickly from member 2ª, and is held out of engagement except during the exact period of time it is desired to drive the shaft 2 positively. So that we are enabled to give a certain predetermined extent of revolution to either roller at each operation of shafts 4 and 2.

*The audible signal.*—Each time the roll-driving devices are set in operation an alarm can be sounded by the following means, so that the operator will know that the device has properly worked, and the attention of passengers may be directed to the machine: On the segment 3 see Figs. 4 and 18 is a pin $3^t$ which projects through a slot in the side-plate D, and engages a notch in the free end of an oscillating lever $33^s$ pivoted on a stud $D^3$ attached to plate D. On this stud beside lever $33^s$ is pivoted a plate $3^u$ provided with an arm $3^w$ carrying a hammer $3^x$ adapted to strike a gong $3^y$ attached to the side-plate as shown, and thus give an audible signal. A spring $3^z$ is arranged to rock the plate and throw the hammer against the gong. The hammer is cocked by the downward movement of lever $33^s$, by means of a dog 13 pivoted on lever $33^s$, and adapted to engage a notch $3^v$ in the plate $3^u$, and rock the plate as the lever descends, until the dog is tripped by striking a pin $D^4$ on plate D, whereupon the hammer is thrown forward by the spring and the gong is sounded. The dog 13 is controlled by a spring $13^a$.

*The mechanism for shifting the roll driving clutch.*—As above stated, either roll 1 or $1^a$ can be positively driven from shaft 2, by means of the clutch $2^k$ and its actuating and controlling mechanism which has been adapted to shift said clutch $2^k$ so as to drive positively either roll 1 or $1^a$ when shaft 2 is driven in the normal operation of the entire machine. Said actuating and controlling mechanism and its functions in operation are as follows:—The clutch $2^k$, Figs. 3 and 12, has an annular groove engaged by one arm 5 of a bell-crank lever pivoted on a bracket $A^5$ on plate A. The other arm $5^a$ of said bell-crank lever extends through a slot in plate A; and is notched at its end where it is loosely engaged by the lower end of a swinging lever $5^c$, Figs. 3, 12, and 10, loosely sleeved on a short rock-shaft 6 projecting through plate A. The lower end of lever $5^c$ is adapted to be actuated forward by means of a spring $5^d$ Fig. 8, so as to move and hold the arms 5 and $5^a$ in such a position that clutch $2^k$ will be pushed on its spline into engagement with clutch-member $2^i$, and there held so that the lower roll $1^a$ will be positively rotated when shaft 2 is driven by the segment 3. On the other hand, when the lower end of lever $5^c$ is actuated backward against the spring $5^d$ and against the arm $5^a$, far enough to shift the arms 5, $5^a$ so as to slide clutch $2^k$ out of engagement with clutch-member $2^i$ and into engagement with clutch-member $2^h$, the position for positively rotating roll 1 from shaft $2^k$ said clutch $2^k$ will be duly held in said position (see dotted lines, Fig. 12) by means of a catch $5^e$ journaled on a stud $A^7$ on plate A, and having a notch adapted to engage a pin $5^f$ on the side of the upper end of lever $5^c$, as seen in Figs. 8, 9, 10, and 11. The co-acting means for causing these two movements of clutch $2^k$, are as follows:—Rigidly fastened to rock-shaft 6, beside lever $5^c$, is a lever $6^a$, the lower end of which is connected by a hinge joint to a rod $9^x$, similar to the rod 9 above described. And in the upper end of said lever $6^a$ is fixed a stud $6^{ax}$ (Figs. 9 and 10) on which is journaled a dog $6^b$ which swings in the same plane as the lever $5^c$. And, dog $6^b$, by means of a spring $6^{ay}$ (Fig. 9) coiled around stud $6^{ax}$, is always pressed down toward the upper edge of lever $5^c$. Now, if we suppose the lower ends of both levers $6^a$ and $5^c$ are in their extreme forward positions, then the long pawl-like nose $6^{b1}$ of the dog $6^b$ will be resting on the upper ledge of lever $5^c$, all as shown in Fig. 10; and bell-crank lever 5—$5^a$ will be resting with its notched arm $5^a$ fully forward, and its arm 5 will be holding clutch $2^k$ in mesh with clutch $2^i$, as shown in the solid lines of Fig. 12. Under these conditions, if we operate the machine normally, rock-shaft 6 will swing the lower end of lever $6^a$ backward in its full stroke. And in the consequent forward movement of dog $6^b$, the nose $6^{b1}$ will glide down into the notch $5^x$ where it will soon meet the upright side of said notch, as shown in Fig. 8, and will finally push the upper end of lever $5^c$ all the way forward. This movement forces the lower end of lever $5^c$ backward so that it overcomes the spring $5^d$ and pushes back the notched end of arm $5^a$ (Fig. $8^a$), causing bell-crank lever 5—$5^a$ to swing so as to slide clutch $2^k$ from clutch-member $2^i$ into mesh with clutch-member $2^h$ the position for operating roll 1 positively when shaft 2 is normally driven. When the lower end of lever $5^c$ has reached this extreme backward position, the upper end of said lever has gone forward far enough to allow catch $5^e$ with its notch aforesaid, normally impelled by spring $5^g$ coiled around stud $A^7$, (Fig. 9) to engage pin $5^f$ in the upper end of lever $5^c$, so as to hold the lower end of said lever $5^c$ locked in said extreme backward position, which fact causes the bell-crank lever 5—$5^a$ to keep the clutch $2^k$ in mesh with the clutch-member $2^h$ so long as roll 1 is to be positively driven, as shown in Fig. $8^a$ and in the dotted lines of Fig. 12. Now, to shift clutch $2^k$ out of mesh with clutch-member $2^h$ and back into mesh with clutch-member $2^i$, at a predetermined time, it is necessary to release lever 5ᶜ, or in other words, to lift the catch 5ᵉ away from pin 5ᶠ; and this is effected in the following way:—In the head of dog 6ᵇ, and reaching out toward lever 6ᵃ, is fixed a pin 6ᵉ, Figs. 8, 9, 10, and 11; and on the outer end of stud Aᵛ is journaled a long wedge-shaped cam 6ᵉ reaching out over pin 6ᵉ and having a finger 6ᶠ overlying a pin Aˢ on plate A, by which pin the downward movement of said cam 6ᵉ impelled by spring 6ᵉˣ, Fig. 9, is normally arrested. There is, also, in the head of dog 6ᵇ a pin 6ᵈ standing out over the lower part of catch 5ᶜ, while the upper part of catch 5ᶜ is a cam-finger 5ᵏ reaching alongside dog 6ᵇ in a position to be engaged by pin 6ᵈ whenever pin 6ᵉ moves up over cam 6ᵉ, to release the member 5ᶜ from pin 5ᶠ. And in operative connection with these parts, we should also notice that rock-shaft 6, Fig. 3, is journaled in plates A and B; and that around the end of said rock-shaft just inside of plate B, is coiled a spring 6ᵖ braced against post 6ᵖˣ in plate B, Figs. 6 and 10, and adapted when permitted to turn rock-shaft 6 normally in such a way as to impel the lower end of lever 6ᵃ forward. Also, on rock-shaft 6, alongside of plate A, is an arm 6ᵒ fastened rigidly to said rock-shaft, Figs. 6 and 7, and on rock-shaft 4, Fig. 6, in the same plane with arm 6ᵒ, is rigidly fixed a short arm 4ᶜ, to which by a hinge joint is connected the lower end of a link 6ᵐ while the upper end of said link by means of a slot 6ⁿ therein is operatively connected to the arm 6ᵒ by means of a pin 6ᵐᵒ fixed therein and adapted to work in said slot; said parts being adapted at the positive torque of shaft 4, to rock shaft 6 positively against the action of spring 6ᵖ said spring serving to return the parts. Now the rod 9ᶻ, Fig. 3, hinged to the lower end of lever 6ᵃ is adapted to slide, with the movement of lever 6ᵃ, back and forth in a guide-sleeve 9ᵉ of a pair of adjacent disks 9ᵃ, 9ᵃ, between which the edge of the ribbon passes as it is wound on either roll (Fig. 5). Said disks 9ᵃ, 9ᵃ, are mounted on a slide 9ᶜ supported on plate A, and are centrally perforated, Fig. 5, so as to allow rod 9ᶻ, under the impulse of spring 6ᵖ and lever 6ᵃ, to pass freely through them, when otherwise permitted. But the ribbon S passing between the disks 9ᵃ, 9ᵃ, normally arrests the rod 9ᶻ, until the arrival of perforation s' in the ribbon S, when rod 9ᶻ will at once plunge through said perforation, which is adapted to allow rod 9ᶻ to pass through, and thus make a forward movement beyond its normal movement. In this extreme forward movement, rod 9ᶻ is limited by pin 6ᵐᵒ in the bottom of slot 6ⁿ. Furthermore, the lengths of the rod 9ᶻ and the wedge-like cam 6ᵉ are relatively adapted to each other with reference to the movement of pin 6ᵉ, so that when rod 9ᶻ in its sleeve-guide 9ᵃ is resting against the ribbon S between the disks 9ᵃ, 9ᵃ, the dog-pin 6ᵉ is resting either against the lower edge of wedge-cam 6ᵉ, the position when the upper roll 1 is being positively driven, as in Fig. 8ᵃ, or said dog pin 6ᵉ is resting against the upper edge of said cam 6ᵉ, the position when the lower roll 1ᵃ is being positively driven, as seen in Fig. 11ᵃ. And so long as rod 9ᶻ is arrested in its forward movement by the ribbon S passing between the disks 9ᵃ, 9ᵃ, dog pin 6ᵉ cannot move back beyond the end of wedge cam 6ᵉ; and under such conditions, clutch 2ᵏ cannot change places. But the shifting of clutch 2ᵏ for the positive operation of one roll or the other, can be done only after dog pin 6ᵉ has passed back beyond the thin end of the wedge cam 6ᵉ, as shown in Fig. 10; and this condition can happen only when the end of rod 9ᶻ has passed forward beyond the ribbon S and slightly beyond the disks 9ᵃ, 9ᵃ, between which said ribbon normally runs. And such an excessive forward movement of the rod 9ᶻ can happen, in the regular operation of the machines, only when a suitable perforation s' in the edge of the ribbon S comes in line with rod 9ᶻ which at rest is normally pressing against said ribbon in the guiding disks 9ᵃ, 9ᵃ. But, after rod 9ᶻ has passed in its extreme forward movement through a perforation s' the clutch 2ᵏ will then be shifted on the next stroke of the rock-shaft 4. And whether clutch 2ᵏ will be thus thrown into mesh with the gear-train of roll 1 or into mesh with that of roll 1ᵃ, will depend upon whether dog pin 6ᵉ, in its forward movement, rides, down under wedge-cam 6ᵉ, or up over said cam; and the course of said pin will finally be determined by the then position of the upper end of lever 5ᶜ provided with the notch 5ˣ. That is, if the upper end of lever 5ᶜ is at its extreme backward position, as it would be with the bell-crank lever 5, 5ᵃ, holding clutch 2ᵏ in mesh with clutch-member 2ⁱ, and with the pin 5ᶠ standing unlatched under catch 5ᵉ back beyond its notch; then the notch 5ˣ in the top edge of lever 5ᶜ, Fig. 10, will be vertically under the end of wedge-cam 6ᵉ and far back enough to allow the nose 6ᵇ¹ to pass down the incline side of the notch 5ˣ allowing pin 6ᵉ in its forward movement to dip soon enough to pass freely under the wedge-cam 6ᵉ; and the nose 6ᵇ¹ will then go on against the vertical wall of notch 5ˣ, as seen in Fig. 8, and forces the upper end of lever 5ᶜ forward far enough to cause bell-crank lever 5, 5ᵃ, to throw clutch 2ᵏ out of mesh with clutch-member 2ⁱ and into mesh with clutch-member 2ʰ; and far enough, also to allow catch 5ᵉ to lock down over pin 5ᶠ and thus hold lever 5ᶜ in this position until the catch 5ᵃ shall have been lifted again so as to unlock pin 5ᶠ. But while pin 5ᶠ remains locked in the notch of catch 5ᵉ, roll 1 will be driven positively at every complete operation of rock-shaft 4. And dog nose 6ᵇ¹ will ride back and forth in the notch 5ˣ and its long sloping side, but not out on the high part of the ledge of lever 5ᶜ; and pin 6ᵉ will ride back and forth under the wedge-cam 6ᵉ because said pin cannot pass back of the cam 6ᵉ into a position for riding up over said cam, until rod 9ᶻ again makes another extreme movement beyond the ribbon S and the disks 9ᵃ, 9ᵇ, which will occur when the next perforation s′ in the ribbon S admits of such a movement. And while the dog pin 6ᵉ is in this position, under the cam 6ᵉ the ribbon S will be intermittently wound upon roll 1, until as we have said, another perforation s′ in the ribbon S between the disks 9ᵃ, 9ᵇ, arrives in line with rod 9ᶻ, when said rod will plunge through said perforation s′ swinging back the upper end of lever 6ᵃ which will, therefore, carry dog 6ᵇ and its pin 6ᵉ back beyond the end of wedge-cam 6ᵉ, in exactly the same position with reference to cam 6ᵉ, as may be seen in Fig. 10; but the top of lever 5ᶜ is now locked forward by catch 5ᵉ, as seen in Fig. 11, so that notch 5ˣ is not vertically under the thin end of wedge-cam 6ᵉ but is so far forward from such location, that, at the next forward movement of dog 6ᵇ the dog pin 6ᵉ will pass the thin end of wedge-cam 6ᵉ before the dog nose 6ᵇ¹ reaches the long sloping side of notch 5ˣ; and as the dog nose 6ᵇ¹, while riding along the high part of the upper edge of lever 5ᶜ carrying dog-pin 6ᵉ higher than the thin end of cam 6ᵉ, said pin 6ᵉ will in this instance, ride up over cam 6ᵉ, Fig. 11, and complete its course thereon, carrying upward with it the dog 6ᵇ and the pin 6ᵈ, which on being raised, engages the lower edge of cam-finger 5ᵏ aforesaid, and thereby lifts the catch 5ᵉ up from the pin 5ᶠ and thus releases the lever 5ᶜ, whose lower end immediately jumps back carrying bell-crank lever 5-5ᵈ with it, thus throwing clutch 2ᵏ back into mesh with clutch-member 2ⁱ, before shaft 2 begins to turn responsive to the spring 4ᵇ which was set at the primary movement of rock-shaft 4. The ribbon S will now be wound by the positive action of roll 1ᵃ, and perforation s′ will pass away from the disks 9ᵃ, 9ᵇ, and rod 9ᶻ will again come to rest against the ribbon S, which will prevent the upper end of lever 6ᵃ from carrying the dog pin 6ᵉ back beyond the end of the end of cam 6ᵉ. Thus roll 1 or 1ᵃ can be positively driven from the shaft 2 by means of clutch 2ᵏ and its actuating and controlling mechanism.

*The devices for rocking shaft 4 to set the mechanism in motion.*—The shaft 4 is rocked in one direction to tension the controlling and driving springs, and while this could be done manually, or by manually controlled mechanism, we prefer to employ electrical devices for setting the shaft, as follows:— The shaft 4 is provided with central braces 4ˣ and 4ʸ fastened to the bottom of the casing, and an arm 4ᵍ which is pivotally connected to the lower end of a plunging core 7 of a solenoid 7ᵃ which is fixed in the top of the casing at right angles to shaft 4 and in rear of the rolls 1, 1ᵃ, or at any other suitable position, so that when the solenoid is energized by the passage of an electric current the core will be drawn in and the shaft 4 rocked so as to operate the parts connected therewith and to tension the springs 4ᵖ, 4ᵇ, the circuit being broken immediately after the shaft is rocked so that the springs may effect the driving of the shaft 2 and the operations of the several parts after and while the solenoid is dead. The solenoid is provided with an audible alarm which consists of an ordinary bell-gong 7ʰ (see Figs. 21 and 22) supported on a post 7ʰ⁶ and held by an ornamental nut 7ʰ¹ screwed on over the post 7ʰ⁶, the bell-gong being sounded by means of a hammer 7ʰ¹¹ pivoted at pin 7ʰ⁸ in post 7ʰ⁷ which with its companion-post 7ʰ⁴ supports bridge 7ʰ⁵ which in turn supports post 7ʰ⁶. In the top of solenoid 7ᵃ are fixed 3 posts 7ʰ² which support a horizontal disk 7ʰ³ which supports the two posts 7ʰ⁷ and 7ʰ⁴, and which is provided with a central hole 7ʰ¹⁴ (Fig. 22) large enough to allow the passage of soft iron block 7ʰ¹⁵ which is fastened rigidly to rod 7ʰ¹³ pivoted at pin 7ʰ¹² in the end of hammer-handle 7ʰ⁹. Now when solenoid 7ᵃ is energized, block 7ʰ¹⁵ is quickly drawn to the solenoid and hammer 7ʰ¹¹ strikes bell-gong 7ʰ and sounds an alarm; but when solenoid 7ᵃ again becomes neutral, closed-spiral spring 7ʰ¹⁰ attached to disk 7ʰ³ and to hammer-handle 7ʰ⁹, quickly pulls hammer 7ʰ¹¹ back to its place of rest as seen in Fig. 21.

While we have shown two audible alarms or signals, at 3ᵛ, and 7ʰ, one or both of them might be dispensed with.

*The electrical circuit controlling devices.*—The operation of the solenoid is controllable by a time mechanism as follows:— Attached to plate A are two binding posts 7ᵐ, 7ⁿ, see Fig. 2, to which are connected the conductors, 7ᵒ, 7ᵖ, one of which, 7ᵒ, has its other end connected to one terminal of the solenoid 7ᵃ, and the other of which, 7ᵖ, has its other end directly connected to the line wire L. The other line wire L running in on the opposite side of the plunging core 7, is connected to the other terminal of the solenoid 7ᵃ, opposite conductor 7ᵒ. Thus it is evident that in order to complete a circuit through the solenoid the current will have to pass through the circuit-making-and breaking mechanism interposed between the posts 7ᵐ, 7ⁿ. This mechanism is as follows:—Connected to post 7ⁿ (which is carefully insulated from the metal portions of the mechanism, as at $7^w$, see Figs. 3, 6 and 7), is a contact-strip 8 which bears upon a cam-like contact-block $8^a$ comprising a conducting plate $8^b$ secured between two insulating blocks $8^x$ and $8^y$ which are hung upon and insulated from a stub-shaft $A^{18}$ between plates A, B, so as to insulate plate $8^b$ from shaft $A^{18}$. Hung on shaft $A^{18}$ beside the contact-block $8^a$, is a lever $8^c$ whose free end is connected to a plunger-rod $8^d$ working in an air-dash-pot $8^e$ secured between plates A, B, and so constructed that the escape of air is nicely controllable by adjusting screw $8^x$, and while the lever $8^c$ may be quickly raised, its descent will be regulated by the dash-pot, so that it will require a determinable time for the lever to descend, and the length of time required for the descent of the lever $8^c$ regulates the intervals between operations of the solenoid, and shifting of the ribbon, as the circuit is closed once only for each upward movement of lever $8^c$. Contact-block $8^a$ has on its internal metal plate $8^b$ a platinum-contact-part $8^{nx}$, at the right in Fig. $6^a$ visible in the notch $8^n$, against which contact-part, finger $8^m$ contacts to complete the electric circuit (see Fig. $7^a$.) Spring $8^k$ performs a duty at either end: at the upper end, it is adapted to actuate upward lever $8^l$; at the lower end where it rests upon pin $8^j$, it is pressing downward on said pin for the purpose of actuating contact-block $8^a$ a little beyond where it would be normally carried by the arm $8^c$ which engages said pin with the edges of a comparatively large hole, so as to give contact-block $8^a$ a little movement independent of the arm $8^c$. In Fig. $7^a$ the actual contact plate $8^b$ between the insulation plates $8^x$ and $8^y$ is of silver; while at the right end of the contact-block $8^a$, between said insulation plates $8^x$ and $8^y$, the space is filled with some inexpensive metal. The double lines, therefore, running from one insulation plate to the other represent only an incidental opening in the joint between the two metal plates which are soldered together inside the block $8^a$. The lever $8^c$ is connected by a link $8^b$ with one arm of a bell-crank lever $4^c$ loosely hung on shaft 4, the other arm of said lever being connected to a stout helical spring $4^b$ which acts to retract the levers against the resistance of the air-dash-pot. The lever $4^c$ has a pin $4^a$ which projects over arm $4^a$ fixed on shaft 4, so that when shaft 4 is rocked, arm $4^a$, engages pin $4^a$ and raises lever $8^c$, thus actuating the circuit-closing devices, but the lever $8^c$ and connected parts can return to position slowly, behind the movement of shaft 4 and arm $4^a$. The contact-block $8^a$ has a pin $8^j$ on its side engaging very loosely a round hole much larger than said engaging pin, see Fig. 7, in the lever $8^c$, and normally pressed down therein by a spring $8^k$ so that although the block is lifted by the lever $8^c$, it can be also raised slightly independently of the lever $8^c$. Pivoted on lever $8^c$ is a bent lever $8^l$ which has a contact-finger $8^m$ on its lower arm adapted to engage a notch $8^n$ in the contact-block, and when in full engagement with said notch the contact-finger $8^m$ contacts plate $8^a$ and closes the electrical circuit; when the finger $8^m$ is out of the notch (as indicated in Fig. $6^1$), the circuit is broken. The upper arm of lever $8^l$ projects above lever $8^c$, and is adapted to be struck by a hammer $18^n$ on a lever $8^o$ pivoted on a stud $A^9$ attached to plate A, and pressed downward by a spring $8^p$. Pivoted on stud $A^9$ beside hammer-lever $8^o$ is a link $8^q$ which carries a spring-pressed dog $8^r$ adapted to engage a notch $8^s$ in the heel of lever $8^o$ and raise the latter when link $8^q$ is swung upward. The lower end of link $8^q$ is slotted and engages a pin $8^t$ on lever $8^c$ so that link $8^q$ is swung upward as lever $8^c$ is raised. The spring $4^b$ draws the lever $8^c$ and connected parts downward, as fast as permitted by the regulator dash-pot $8^e$, and just before lever $8^c$ reaches the lowest position, lever $8^l$ (under the influence of spring $8^k$), presses contact-finger $8^m$ against contact-block $8^a$, and the movement of contact-block $8^a$ is then arrested by a pin $B^x$, on plate B, which is so located that the further downward movement of lever $8^c$, to its lowest position, will allow finger $8^m$ (under influence of spring $8^k$) to snap into notch $8^n$, thus closing the electrical circuit through the apparatus (as indicated in Fig. 6) whereupon the solenoid is energized, and rocks shaft 4, throwing lever $8^c$ upward, through the described connection, and in this upward movement the hammer is elevated by dog $8^r$, and just before the lever $8^c$ reaches its uppermost position the dog is tripped by engaging a pin $B^y$, on plate B, releasing the hammer, which drops upon the upper arm of lever $8^l$, and knocks it downward, throwing the contact-finger $8^m$ out of notch $8^n$, and instantly breaking the circuit, the parts remaining in open position until lever $8^c$ has nearly descended when the contact is closed again, as above described. It should also be added that the pin $8^j$ fastened in contact-block $8^a$ and extending through the large hole in lever $8^c$, is for the purpose of taking contact-block $8^a$ along with the lever $8^c$ up and down; and the hole in lever $8^c$ is much larger than pin $8^j$ for the purpose of allowing contact-block $8^a$ a little movement independent of the lever $8^c$ so that when lever $8^c$ is nearly down, contact-block $8^a$ may be stopped in its downward course by the pin $B^x$, so that contact-finger $8^m$, which is moving downward with lever $8^c$ may overtake the notch $8^n$ and thus spring into it, making the contact with a platinum $8^{nx}$ and completing the circuit again through the machine. Thus the electrical circuit is both closed and opened with a snap-action, the breaking of the circuit being effected so quickly that sparking or arcing is practically avoided. The lever $8^c$ is of course elevated quickly, but as above stated its descent is slowed and regulated by the dash-pot $8^e$, and by graduating the escape of air therefrom by screw $8^s$ the circuit can be closed regularly, at greater or less intervals of time, as desired. These automatic circuit-closing devices are particularly useful when the apparatus is used for displaying signs for which the apparatus is particularly well adapted.

*The ribbon guides and controlling devices.*—In order to make the indicator automatic in the operation and the control of both its sign-changing and its ribbon-reversing functions, we have provided simple means by which the ribbon itself controls both of said functions by controlling the action of the shifting devices for the clutches $2^c$ and $2^k$; and the rods 9 and $9^z$ already referred to, are parts of said controlling device.

At each side of the machine are ribbon guides composed of opposed convexed disks $9^a$, $9^a$, the edges of the ribbon S passing between the adjacent disks as shown in Figs. 3, 5, 8. These guides are mounted on slides $9^c$, supported on plates A, C, respectively, and pushed outward by springs $9^d$, see Figs. 4 and 6 and inward by door E, so as to be self-adjusting to the proper conditions, as shown. The disks $9^a$ are centrally perforated for the passage of the forward ends of the rods 9, $9^z$, above referred to, the inner disks $9^a$ having guide-sleeves $9^e$ to support the forward ends of rods 9, $9^z$, as shown. When the ribbon is in place its imperforate edges stop the forward spring-actuated movements of rods 9, $9^z$ each of these rods however performs a useful office. The left-hand rod 9 serves to stop the ribbon after each shift, with the sign centrally displayed at the sight-opening in the casing; for this purpose the ribbon S is provided on its left-hand margin, opposite each symbol displayed thereon, with an opening s; these openings pass through the guide, and when an opening comes opposite the rod 9, the latter is free and can spring forward, and upon so doing the rod stops the ribbon, and simultaneously, see Figs. 16-17 the connected lever $3^c$ trips dog $3^b$, releasing lever $3^h$, which instantly actuates rod $3^h$, and throws the clutch-member $2^d$, out of engagement with the clutch member $2^c$, thus disengaging the driving shaft 2 from the driving segment, and stopping the travel of the ribbon instantly, until the mechanisms are reset and rod 9 withdrawn from the ribbon opening, by the next succeeding operation of the solenoid or shaft 4.

The rod $9^z$ controls the reversing clutch $2^k$; so long as an unperforated portion of the ribbon edge runs through the guide, rod $9^z$ is held back, so that lever $6^a$ cannot make a full forward swing sufficient to give the excessive movement to dog $6^b$, necessary to enable it to clear cam $6^e$, and cause the shifting of the reversing clutch $2^k$, as above described; but at each end of the ribbon (or at any point where it may be desired to have the ribbon reverse its movement) an opening $s'$ is made in the right-hand margin of the ribbon, see Fig. 8 and when this opening reaches the guide, it allows the rod $9^z$ to project through it, thus allowing spring $6^p$, to impart an excessive movement to lever $6^a$, and allow the shifting of the clutch $2^k$, as above described, so that if the ribbon was being wound on roll 1, the latter roll will become idle, and roll $1^a$ will be driven, and the ribbon thus be reversed. By placing an opening $s'$ at each end of the ribbon, it will automatically reverse itself at each end, and the apparatus can operate automatically so long as sufficient power is supplied to rock the shaft 4. The guides $9^a$—$9^a$ perform another useful function. They are mounted on slides $9^c$ so as not to be in their normal position for the regular operation of the indicator as a whole, until the door E of the casing is closed; for when the door E is open the guides $9^a$—$9^a$ throw the ribbon out of reach of the rods 9 and $9^z$; but when this door is closed it pushes the slides $9^c$ backward, with the guides, bringing them into proper relative position with the forward ends of rods 9, $9^z$. But when the door E is opened, they spring forward as indicated in dotted lines Fig. 16, drawing and holding the ribbon margins away from and clear of the ends of rods 9, $9^z$, so that the latter will not engage any of the holes or openings in the margins of the ribbon, and consequently when the door is open the ribbon spools can be readily wound or unwound by hand, without danger of the rods engaging the holes and tearing the ribbon.

In some instances it may be desirable to reverse the ribbon movement, before an opening $s'$ comes to position, or to open the door E without reversing the ribbon; for this purpose we provide the following devices:—The rod $9^z$ has a pin $9^n$ which projects through a slot in plate A and behind a stop-arm $9^o$ on a lever $9^p$, see Figs. 5, 6, 7, 8 pivoted at $o^a$ on the plate A, and pressed into position to arrest pin $9^n$ by a spring $9^q$ see Fig. 20. These parts would not come into use until the door E is opened, then the arm $9^o$ prevents the forward movement of rod $9^z$, although the guide carries the ribbon margin away from the rod. Now if the operator desires to reverse the ribbon movement, he pushes lever 9p inward, raising stop 9o out of the way of pin 9n and spring 6p throws the rod forward, imparting the excess motion to pawl 6b, and allowing the shifting of the clutch-member 2k, as above described. When the door E is closed, it pushes lever 9p in and holds stop 9o out of the path of pin 9n.

The clutch shifting-lever 5a, is provided with an arm 15, carrying a direction indicator 15a, see Figs. 1, 3, 6 and 7, which appears at a sight-opening e in the front door E see Fig. 1, so that the operator can readily see whether the mechanism is set to run the ribbon in the proper direction.

While the rolls 1; 1a can be turned by hand, being free from any motive connection with the driving-shaft except when being actually driven, we prefer to inclose them fully in the casing of the machine so that they cannot be handled, by careless persons; but in order to allow them to be readily rotated or removed when desired, we make openings g g, in the outer end wall G of the casing, see Figs. 1 and 2, opposite the heads of the stub-shafts 1c; these openings are closable by self-adjusting shutters g', g', on levers g2. see Fig. 19 pivoted on studs g3 attached to the inner side of plate G, and a spring g4 is provided to throw the shutters away from the openings when the door E is opened; and a slide g5 is pivotally connected to the inner ends of both levers g2, g2. And when the door is open, and the openings g uncovered, the slide projects beyond the edge of the case,—and when door E is being closed it engages the projecting end of the slide, and pushes it inward, rocking the levers g2 so as to cause shutters g' to close openings g, and holding them closed until the door E is opened; thus no one can tamper with the interior mechanism unless he first opens the front door E, which is provided with a lock.

The door E is provided with the usual large glass window or opening through which the symbols, signs, etc., on the ribbon are displayed successively in the usual manner. Door E is held in closed position by two latches E' of any suitable construction, one at each end as shown in Fig. 1 and is secured by a lock as indicated at E2.

Having described our invention what we claim as new and desire to secure by Letters Patent is:—

1. In an indicator, the combination of a ribbon-roll, a perforated ribbon, a driving-shaft and auxiliary means for rotating said roll; with mechanism for automatically releasing said shaft from its driving means, and an automatic mechanical tripping device for said mechanism controlled by the perforated ribbon, substantially as described.

2. In an indicator, the combination of ribbon rolls, a perforated ribbon carried thereby, a roll driving shaft, gearing between the shaft and rolls, a pinion on the shaft, a clutch for locking the pinion to the shaft, means for rotating the pinion, means for disengaging the clutch, a tripping device for the disengaging means having a rod adapted to press against the margin of the ribbon and to release the disengaging means when said rod finds an opening in said margin, substantially as described.

3. The combination of ribbon rolls, a perforated ribbon carried thereby, a driving shaft, gearing for driving the rolls from the shaft, means for driving the shaft, means for disengaging the shaft from the driving means, a pivoted lever for operating said means, a second lever beside the first, a rod connected to said second lever adapted to press against the margins of the ribbon, means for shifting the first-named lever to inoperative position, means for holding it in such position, and means whereby the second lever releases the first lever when the rod finds an opening in the ribbon, substantially as described.

4. In an indicator the combination of the ribbon rolls, a perforated ribbon carried thereby, the roll driving shaft, gearing between the shaft and rolls, spring-controlled means for rotating said shaft, a clutch for locking said shaft to the driving means, and a clutch-releasing device adapted to co-act with the perforated ribbon to unlock the clutch at predetermined times, substantially as described.

5. In an indicator, the combination of ribbon-rolls, a perforated ribbon carried thereby, a roll-driving shaft, gearing between the shaft and rolls, a clutch for locking either roll to the shaft, a pinion on the shaft, a clutch for locking the pinion to the shaft, an oscillating segment for rotating the pinion, and means including a rod adapted to press against the margin of the ribbon for disengaging the clutch from the pinion when said rod finds an opening in the margin of the ribbon, substantially as described.

6. The combination of ribbon rolls, a perforated ribbon carried thereby, a driving shaft, gearing for driving the rolls from the shaft, means for driving the shaft, a clutch for locking the shaft to the driving means, a rod, a lever for disengaging the clutch, a pivoted lever for operating said rod, means for setting said lever when the clutch locks the shaft to the driving means, a second lever beside the first, a rod connected to said lever adapted to press against the margins of the ribbon, and means whereby the second lever releases the first lever when the rod finds an opening in the ribbon, substantially as described.

7. The combination of ribbon rolls, a perforated ribbon carried thereby, a driving shaft therefor, and gearing between the shaft and rolls, a loose pinion on said shaft, a clutch adapted to lock the pinion to the shaft, a pivoted clutch operating lever, an oscillating segment engaging the pinion, means for throwing the clutch into engagement with the pinion, a spring-actuated lever, and a push-rod connected therewith for disengaging the clutch from the pinion; a dog for locking said lever when the rod is retracted; a second lever beside the first lever adapted to disengage the dog therefrom, and a rod connected with the second lever adapted to engage the margin of the ribbon, and to release the lever and disengage the dog when the rod finds a hole in the ribbon.

8. The combination of ribbon rolls, a perforated ribbon carried thereby, a driving shaft, and gearing between the shaft and rolls, a loose pinion on said shaft, a clutch adapted to lock the pinion to the shaft, a pivoted clutch-operating lever, an oscillating segment engaging the pinion, a rock-shaft and connections for actuating said segment in one direction, a spring for moving the segment in the opposite direction, means for throwing the clutch into engagement with the pinion, a spring actuated lever, and a push-rod connected therewith for disengaging the clutch from the pinion; a dog for locking said lever when the rod is retracted; a second lever beside the first lever adapted to disengage the dog therefrom, a rod connected with the second lever adapted to engage the margin of the ribbon, and to release the lever and disengage the dog when the rod finds a hole in the ribbon.

9. In combination, an indicator-ribbon having perforations and connections for intermittently arresting it in its course for the display of each sign thereon, ribbon-rolls for carrying said ribbon, a driving-shaft and mechanism for driving either roll from said shaft intermittently in one direction for a predetermined extent, means between said shaft and the periphery of said rolls whereby the roll which winds the ribbon upward is driven with greater force than the roll which winds the ribbon downward; with means whereby when one roll is driven the other is trailing, and devices controlled through the medium of the perforated ribbon for automatically unlocking said driving shaft from one roll when a predetermined part of the perforated ribbon has been wound upon that roll and of likewise locking said shaft to the other roll now to be driven.

10. In combination, the perforated ribbon, the ribbon-rolls, a driving-shaft adapted to move with uniform torque and in only one direction when driving, adjacent gears on said shaft and connections for driving the rolls from said shaft in either direction, gear-trains of unequal leverage between said shaft and rolls to compensate for the gravitation of said ribbon, and a clutch mechanism on said shaft whereby when one of said adjacent gears is fast to said shaft the other is freed; with devices controlled through the instrumentality of the perforated ribbon for automatically unlocking the driving-shaft from one of the rolls when a predetermined part of the perforated ribbon has been wound upon said roll and of likewise locking said shaft to the other roll now to be driven, substantially as described.

11. In an indicator, the combination of a driven-shaft, a perforated ribbon, a pair of ribbon-rolls, separate and dissimilar gear-trains of unequal leverage for driving said rolls from said shaft now in one direction with one force and now in the other direction with a different degree of force, a double-headed clutch on said shaft for locking either gear-train to the shaft so as to drive either roll positively and allow the other to trail, devices controlled through the medium of the perforated ribbon for automatically unlocking said shaft from one of said gear-trains when a predetermined part of the ribbon has been wound upon its connected roll and of likewise locking said shaft to the other gear-train and its connected roll now to be positively driven.

12. In an indicator, the combination of a driven shaft, a pair of ribbon rolls, a perforated ribbon carried thereby, separate gear-trains for driving either roll from the shaft, clutch mechanism for locking either gear-train to the driving shaft so as to drive one roll while the other trails, a spring-actuated lever for shifting the clutch, devices for actuating said lever, and a tripping rod controlled by and pressed against the ribbon, adapted to release the said actuating mechanism when the rod finds an opening in the ribbon, substantially as described.

13. The combination of a perforated ribbon, opposite ribbon-rolls, means for driving either roll, a clutch-device adapted to lock either roll to the driving means and release the other, an oscillating lever for shifting said clutch, means for actuating said lever in either direction, and means for holding it inoperative at either end of its arc of oscillation, beside the first lever a second oscillating lever spring-actuated in one direction and carrying by means of a hinge-joint at its lower end a rod adapted to press against the margin of the perforated ribbon and to allow said second lever to make an excessive forward movement when a perforation of said ribbon arrives opposite the end of said rod, and devices adapted to co-act with said oscillating levers so that the first lever will act to shift said clutch-device from one roll to the other on the next backward movement of said second lever following an excessive forward movement of said second lever, substantially as described.

14. The combination of a perforated ribbon, opposite ribbon rolls, means for driving either roll, a clutch adapted to lock either roll to the driving means and release the other, an oscillating lever for shifting said clutch, a second oscillating lever beside the first, a pawl carried by the second lever adapted to engage the first lever, a catch for locking the first lever, and ribbon-controlled devices for determining the extent of movement of the second lever, substantially as described.

15. The combination of opposite ribbon rolls, a perforated ribbon carried thereby, means for driving the rolls, a clutch for locking one roll to the driving means and releasing the other; a clutch operating lever, a controlling lever, a rod bearing against said ribbon and connected with said controlling lever adapted to permit an excess movement thereof when the rod finds an opening in the ribbon, a dog carried by the controlling lever adapted to engage the first lever, and devices whereby the dog is alternately thrown in and out of engaging position, on successive excessive movements of the controlling lever.

16. The combination of the driving shaft, a perforated ribbon, opposite ribbon rolls, independent sets of gearing for driving either roll from the shaft, a clutch device adapted to lock either set of gearing to the shaft and release the other, an oscillating lever for shifting said clutch, a spring for throwing the lever in one direction; a second oscillating lever beside the first lever, a dog on said lever adapted to engage the first lever for shifting it when the second lever makes an excessive movement, and ribbon controlled devices for determining the excessive movements of said second lever.

17. The combination of a driving shaft, opposite ribbon rolls, a perforated ribbon carried thereby, independent sets of gears for driving either roll from the shaft, a clutch adapted to lock either set of gears to the shaft and release the other, an oscillating lever for shifting said clutch, a spring for throwing the lever in one direction, a second oscillating lever beside the first, a pawl carried by the second lever adapted to engage the first lever, and move it against the resistance of the spring, a catch for locking the first lever, and ribbon-controlled devices for determining the extent of movement of the second lever, substantially as described.

18. The combination of a driven shaft, opposite ribbon rolls, a perforated ribbon carried thereby, separate sets of gearing for driving the rolls from the shaft, a clutch for locking either set of gearing to the shaft and releasing the other, a clutch operating lever spring-actuated in one direction, a controlling lever, a rod connected with said controlling lever engaging the ribbon and adapted to permit an excess movement thereof when the rod finds an opening in the ribbon, a dog carried by the controlling lever adapted to engage the first lever, and devices whereby the dog is alternately thrown in and out of engaging position on successive excessive movements of the controlling lever.

19. The combination of a perforated ribbon, means for winding said ribbon, a driving-shaft adapted to move with uniform torque for driving said means, a clutch for controlling said means so as to wind up one end of said ribbon, at a time, and simultaneously allow the other end to unwind, an oscillating lever spring-actuated in one direction for shifting the clutch, a catch for holding the lever in one position, a rocking lever beside the first lever, means for rocking said lever, ribbon controlled devices for limiting the movement of said rocking lever, a dog on said rocking lever, and a cam device whereby upon one excessive movement of the rocking lever the dog is caused to disengage the catch, and upon the next excessive movement to move the first lever into engagement with the catch, substantially as described.

20. The combination of an indicator ribbon, adjacent ribbon rolls, a driven shaft, gears for driving the rolls from said shaft in opposite directions, a clutch for locking either gear to the shaft and releasing the other, an oscillating lever spring-actuated in one direction for shifting the clutch, a catch for holding the lever in one position, a rocking lever beside the first lever, means for rocking said lever, ribbon controlled devices for limiting the movement of said rocking lever, a dog on said rocking lever adapted to engage the first lever, and a cam device whereby upon one excessive movement of the rocking lever the dog is caused to disengage the catch, and upon the next excessive movement the dog is allowed to force the first lever into engagement with the catch, substantially as described.

21. The combination, for the purpose specified, with ribbon spools, a perforated ribbon carried thereby, mechanism for driving the spools, and a clutch and connections for controlling the driving of said spools; of a clutch shifting lever spring-actuated in one direction, a catch for locking said lever having an arm, a rocking lever beside the first lever, a dog on said rocking lever provided with a tooth adapted to engage said first lever at one excessive forward movement of said rocking-lever so as to force said first lever to shift said clutch on the next backward movement of said rocking-lever, pins fixed in said dog standing out on either side, a cam-plate adapted to engage one of said dog-pins to raise said dog clear from said first lever while the other of said dog-pins raises the arm of said catch thus releasing said first lever when after the next excessive forward movement said rocking-lever is next moved backward, and a rod pivoted to the end of the rocking lever adapted to engage the margin of the ribbon and permit excessive forward movement of the rocking lever when the rod finds an opening in the ribbon, substantially as described.

22. In combination, a perforated indicator-ribbon, ribbon-rolls for winding the ribbon in either direction so as to display the indications on said ribbon in its movement either way, spring-actuated means adapted to operate said rolls by being reset for each movement of the ribbon in either direction, spring-actuated devices controlled by the perforated ribbon to reverse the direction of movement of said ribbon, a rock-shaft and connections for operating said means and said devices, a dash-pot for controlling the operation of said means, and means for operating said rock-shaft.

23. In combination, a sign-bearing perforated ribbon, ribbon-rolls for winding the ribbon in either direction to properly display the signs on said ribbon in its transit either way, spring-actuated means adapted to operate said rolls by being reset for each movement of the ribbon in either direction as in the display of each sign thereon, spring-actuated reversing mechanism coacting with said perforated ribbon to reverse the movement of said ribbon at predetermined places, with a dash-pot attached for regulating the operation of said means and mechanism, a rock-shaft adapted to set said spring-actuated means and mechanism, and an electro-magnet whereby the rock-shaft is rocked to set said spring-actuated means and mechanism to perform their cycles of operation.

24. In combination, a perforated sign-ribbon, ribbon-rolls operative in either direction for displaying the signs, two stub-shafts for rotating said rolls to wind the ribbon in either direction, spring-actuated means for operating said stub-shafts, spring-actuated means controlled by said perforated ribbon to reverse the rotation of said stub-shafts; with a rock-shaft and connections to reset said spring-actuated means to perform their cycles of operation.

25. In combination, an indicator ribbon bearing indications at intervals and having along one side-margin opposite the indications thereon perforations s, and along the other side-margin opposite the first and the last indications thereon perforations s'; adjacent ribbon-rolls adapted to wind said ribbon in either direction for the display of said indications; spring-actuated devices controlled by said perforated ribbon for operating said rolls in either direction intermittently; mechanism controlled by said perforated ribbon for automatically reversing the movement of said rolls after a predetermined number of indications have been intermittently displayed so that they may all be re-displayed again intermittently in reverse order, a rock-shaft and connections for setting said spring-actuated devices and mechanism to perform their cycle of operations for each indication-display and end-reverse so that as long as motive power is properly applied to rock said shaft said ribbon will repeatedly travel back and forth displaying with intermittent rests all its indications one at a time and automatically reversing at the end ones, and an oil dash-pot in connection with said rock-shaft adapted to absorb and counteract shocks and fluctuations in the applied motive power.

26. In combination, a pair of ribbon-rolls, gearing for operating said rolls in either direction, a spring-motor for driving said gearing, a symbol-bearing indicator ribbon attached to said rolls and having perforations s near one edge and perforations s' near its other edge near the ends of said ribbon, means co-acting with said ribbon and its perforations s for controlling the starting and stopping of said ribbon properly to display each of the symbols thereon, devices co-acting with said ribbon and perforations s' for automatically controlling the reversing of the movement of said ribbon at said perforations s'; a rock-shaft and connections whereby said spring-motor, means and devices are tensioned and set to the performance of their cycles of operation; an oil-dash-pot to regulate the movement of said spring-motor and gearing and said rock-shaft and connections to prevent injurious, spasmodic actions, or too violent strain within said parts; and means for rocking said shaft at the proper times.

27. In combination, a sign-carrying ribbon having perforations along one longitudinal line to cause the arrest of said ribbon intermittently for the proper display of each of the signs thereon and having reversal perforations in another longitudinal line near its ends to cause the successive reversals in the movement of said ribbon at the first and the last of said signs, displaying devices mechanically controlled through the medium of the display perforations in the ribbon for automatically causing the operation and the arrest of said ribbon properly to display each sign thereon, reversal devices mechanically controlled through the medium of the reversal perforations in said ribbon for automatically causing successive reversals in the movement of said ribbon at the reversal perforations, spring-pressed means for operating both sets of said devices, adjacent ribbon rolls for carrying said ribbon, gearing for operating the rolls in either direction, a spring motor for driving said gearing, a rock-shaft and connections whereby said spring motor and devices are tensioned and set to perform their cycle of operations; with an oil-dash-pot in connection with said spring motor and rock-shaft adapted to regulate the movement of both said motor and rock-shaft as well as their connections to obviate too violent strain or concussion in said parts, electro-magnetic means connected to an arm on the rock-shaft, and means for closing an electric circuit through said electro-magnetic means whereby said shaft is rocked at proper times to put said spring motor and devices into operation to display another sign.

28. In combination, the ribbon roll actuating devices, automatic spring actuated reversing devices, an electro-magnet for cocking said devices, an oil-dash-pot in connection with said electro-magnet and devices to regulate their action, an electrical circuit-maker-and-breaker moved in one direction by the magnet, a spring for moving the circuit-maker-and-breaker in the opposite direction, and means for regulating the intervals between the closings of the circuit.

29. In an indicator device, the combination of spring-actuated driving means for putting such device through a cycle of operations, an electro-magnet and connections for cocking the driving means, and an oil-dash-pot connected to said driving means and to said electro-magnet and connections to regulate the motion of said parts so as to prevent shocks and strains therein; with means for adjusting and fixing the intervals between the successive operations of the magnet, comprising a lever, a movable contact mounted on said lever, a relatively fixed contact, means for moving the lever in one direction when the magnet is energized, a spring for retracting the lever, means for bringing the contacts together when the spring returns the lever to normal position, and means for separating the contacts when the lever has been moved a predetermined distance by the energizing of the magnet, substantially as described.

30. In a machine of the character described, the combination with a ribbon and ribbon operating devices, of ribbon guides engaging the margins of the ribbon, and adapted to move the ribbon out of the machine when opened, substantially as described.

31. The combination with ribbon goods, a ribbon and ribbon engaging devices, and a casing having a front door, of ribbon guides engaging the margins of the ribbon, and adapted to move the ribbon out of the way of the ribbon engaging devices when the front door of the casing is opened, substantially as described.

32. In combination, a casing provided with a front door, a ribbon and ribbon rolls thereon, ribbon guides mounted on sliding supports, means for projecting said supports forwardly when the front door of the casing is opened, said slides being moved back when the door is closed, substantially as described.

33. In an indicator, the combination of a casing having a door, a perforated ribbon and ribbon rolls in said casing adjacent the door, ribbon guides within the casing adapted to be moved inward by the door when the latter is closed, and springs for forcing the guides outward when the door is opened.

34. In an indicator, the combination of a casing having a front door, a ribbon and ribbon rolls in said casing adjacent the door, ribbon guides within the casing, slides carrying said guides adapted to be moved inward by the door when the latter is closed, and springs for forcing the guides outward when the door is opened.

35. In an indicator, the combination of the casing having a door, a perforated ribbon, ribbon rolls, their actuating mechanism, ribbon guides at each side of the casing, controlling devices adapted to engage apertures in the ribbon through the guides, springs for throwing the guides forward so as to clear the ribbon of the controlling devices when the door is opened, said guides being adapted to be forced back by said door when it is closed, all substantially as described.

36. In an indicator of the character described, the combination of a casing, ribbon rolls therein, a perforated ribbon carried thereby, a driving shaft, opposing sets of gears for actuating the rolls from the shaft, a clutch adapted to lock either set of gears to the shaft and release the other, a guide engaging the margin of the ribbon, and a clutch controlling device adapted to engage the margin of the ribbon through the guide, substantially as described.

37. In an indicator of the character described, the combination of a casing provided with a door, ribbon rolls therein, a perforated ribbon carried thereby, a driving shaft, gears for actuating the rolls from the shaft, a clutch adapted to lock either roll drive to the shaft and release the other, and a clutch controlling device adapted to engage the margin of the ribbon; with a finger controlled lever for limiting the movement of the controlling device when the casing door is opened, said lever being thrown and held in inoperative position by the casing door when the latter is closed.

38. In an indicator of the character described, the combination of a casing provided with a door, ribbon rolls therein, a perforated ribbon carried thereby, a driving shaft, opposite sets of gears for actuating the rolls from the shaft, a clutch adapted to lock either set of gears to the shaft, and release the other, a guide engaging the margin of the ribbon, and a clutch controlling device adapted to engage the margin of the ribbon through the guide; with slides carrying the ribbon guides, and means for projecting the slides forwardly, when the casing door is opened, so as to clear the ribbon of the controlling device, said door being adapted to move the guides back into operative position when the door is closed.

39. In an indicator of the character described, the combination of a casing provided with a door, a perforated ribbon, ribbon rolls therefor, a driving shaft, independent gears for actuating the rolls from the shaft, a clutch adapted to lock either roll driving gear to the shaft and release the other, and a clutch controlling device adapted to engage the margin of the ribbon; with a finger-controlled lever for limiting the movement of the controlling device when the casing door is opened, said lever being thrown and held in inoperative position by the casing door when the latter is closed; slides carrying ribbon guides, and means for projecting the slides forwardly, when the casing door is opened, so as to clear the ribbon of the controlling devices, the guides being moved back into operative position when the door is closed, substantially as described.

40. In an indicating device of the character described, the combination of the casing provided with a door and having openings in one of the ends of said casing, shutters for closing said openings, said shutters being adapted to be closed and held so closed when said door is closed and latched, substantially as described.

41. In an indicator of the character described, the combination of a casing having a door, ribbon rolls in said casing, said casing having openings opposite the ends of said ribbon rolls, and actuating mechanism for said rolls; with shutters for closing said openings; pivoted levers carrying said shutters, a slide connected to said levers adapted to project into the path of the door, and permit the shutters to open when the door is opened, said slide being pushed inward by said door when the latter is closed, thereby closing the shutters, substantially as described.

42. In an indicator of the character described, the combination of a casing having a door, provided with roll shafts in said casing, said casing having openings opposite the ends of the ribbon roll shafts, and actuating mechanism for said rolls; with shutters for closing said openings; and pivoted spring pressed levers carrying said shutters, substantially as described.

43. In an indicator, the combination of the perforated ribbon, ribbon-rolls adapted to wind the ribbon in either direction for the practical display of the indications thereon, a driving shaft adapted to rotate intermittently always in the same direction and with the same torque when driving said rolls in either direction, means for actuating said ribbon-rolls from said shaft with a greater force when they are winding the ribbon upward than when they are winding the ribbon downward, to compensate for the gravitation of the ribbon, a pinion loosely mounted on said shaft, a clutch for locking and unlocking said pinion and shaft, an oscillating segment always engaging the pinion, and a spring motor to drive the segment positively for actuating said shaft.

44. In an indicator, the combination of ribbon rolls, a perforated ribbon, gearing for operating the rolls, a driving shaft, a pinion loosely mounted thereon, a clutch for locking the pinion to the shaft, a clutch lever, an oscillating segment engaging the pinion, a spring for moving the segment in one direction, and a dash-pot for regulating the spring actuated movement of the segment.

45. In an indicator, the combination of ribbon spools and connected gearing, an indicator ribbon, a driving shaft, a pinion loosely mounted thereon, a clutch for locking the pinion to the shaft, a clutch-lever, an oscillating segment engaging the pinion, a spring for moving the segment in one direction, and a dash-pot for regulating the spring actuated movement of the segment; with a spring-actuated rod adapted to disengage the clutch, means for setting said rod and for holding it in an inoperative position, and means for tripping said rod to disengage the clutch when the ribbon has made a predetermined extent of movement, substantially as described.

46. In an indicator, the combination of ribbon rolls and connected gearing, a perforated ribbon, a shaft, a pinion thereon, a clutch for locking the pinion to the shaft, a pivoted clutch lever, a dog engaging said lever, means for operating the pinion, means for disengaging the dog from the lever to permit the clutch to lock the pinion to the shaft, and a spring actuated device adapted to actuate the clutch lever and disengage the clutch, substantially as described.

47. In an indicator, the combination of ribbon rolls and their gearing, a perforated ribbon, a shaft, a pinion thereon, a clutch for locking the pinion to the shaft, a pivoted clutch-lever, a dog engaging said lever, means for operating the pinion, means for disengaging the dog from the lever to permit the clutch to lock the pinion to the shaft, a spring-actuated rod adapted to actuate the clutch-lever and release the clutch; means for cocking said rod, and means for tripping it at the proper moment, substantially as described.

48. In an indicator, the combination of the indicator ribbon, the ribbon-rolls, a driving shaft, two separate sets of gearing adapted to actuate positively either roll at a time from said shaft so that one of the rolls is given both a direction and a degree of force different from the direction and the force given the other, a pinion on said shaft, a clutch for locking the pinion to the shaft, an oscillating segment engaging the pinion, a rock-shaft and connections for moving said segment in one direction, a spring for returning the segment, an oil-dash-pot resisting in both directions of dasher-movement and connected operatively with said segment and said rock-shaft, means for throwing the clutch into engagement with the pinion in the end of the rock-shaft stroke and for holding it in said engagement during the spring-actuated movement of the segment.

49. In an indicator, the combination of ribbon rolls, a driven shaft, a pinion thereon, a clutch for locking the pinion to the shaft, a clutch operating lever, an oscillating segment engaging the pinion, a rock-shaft and connections for moving said segment in one direction, a spring for returning the segment, a dash-pot for controlling the return movement of the segment; means for throwing the clutch into engagement with the pinion at the end of the rock-shaft stroke and for holding it in said engagement during a part of the spring-actuated movement of the segment, and means for tripping the clutch when a predetermined part of the ribbon has been wound.

50. In an indicator, the combination of a perforated ribbon, ribbon rolls, a roll driving shaft, a loose pinion and clutch thereon, means for normally holding the clutch open, an oscillating segment meshing with the pinion, means for locking the pinion to the shaft at the finish of one stroke of the segment, and for holding it so locked and disengaging it therefrom on the return stroke of the segment when the ribbon has completed its predetermined distance of travel, substantially as described.

51. In an indicator, the combination of a perforated ribbon, ribbon rolls, with a roll driving shaft, a loose pinion thereon, a clutch for locking the pinion to the shaft, means for normally holding the clutch open, an oscillating segment meshing with the pinion, means for moving the segment in one direction, a spring for moving the segment in the opposite direction, the clutch operating mechanism locking the pinion to the shaft when the segment is about to be actuated by the spring, and for disengaging the pinion from the shaft on the spring stroke of the segment when the ribbon has completed its predetermined distance of travel, substantially as described.

52. In an indicator, the combination of ribbon rolls, with the roll driving shaft, a pinion thereon, a clutch for locking the pinion to the shaft, means for locking the clutch in open position, means for imparting rotatory movements to the pinion, means for moving the clutch into engagement with the pinion, and means for disengaging the clutch, substantially as described.

53. In an indicator, the combination of ribbon rolls, with the roll driving shaft, a pinion thereon, a clutch for locking the pinion to the shaft, a pivoted clutch shifting lever, a dog for locking the clutch lever in open position, means for imparting rotatory movements to the pinion, means for disengaging the dog from the clutch, and means for disengaging the clutch.

54. In an indicator, the combination of ribbon rolls, a driving shaft, a pinion thereon, a clutch for locking the pinion to the shaft, an oscillating segment engaging the pinion, a rock-shaft and connections for moving the segment in one direction, a clutch-operating lever, a dog for locking said lever in open position, and a trip device for releasing said dog just before the positive drive movement of the segment.

55. In an indicator, the combination of ribbon rolls, a driving shaft, a pinion thereon, a clutch for locking the pinion to the shaft, an oscillating segment engaging the pinion, a rock-shaft and connections for moving the segment in one direction, a spring for returning the segment, and a dash-pot for regulating the return spring-actuated movement of the segment, a clutch-operating lever, a dog for locking said lever in open position and a trip device for releasing said dog just before the positive driving movement of the segment.

56. In an indicator, the combination of a perforated ribbon, ribbon rolls, a driving shaft, a pinion thereon, a clutch for locking the pinion to the shaft, an oscillating segment engaging the pinion, a rock shaft and connections for moving the segment in one direction, a spring for returning the segment, a clutch-operating lever, a dog for locking said lever in open position, and a trip device for releasing said dog just before the positive driving movement of the segment; with a spring-pressed lever, a rod connected therewith adapted to engage the clutch lever and throw the clutch open, and devices co-acting with the perforated ribbon for controlling said spring-pressed lever, substantially as described.

57. In an indicator, the combination of a perforated ribbon, ribbon rolls, a driving shaft, a pinion thereon, a clutch for locking the pinion to the shaft, an oscillating segment engaging the pinion, a rock-shaft and connections for moving the segment in one direction, a spring for returning the segment, a dash-pot for regulating the return spring-actuated movement of the segment; a clutch-operating lever, a dog for locking said lever in open position, and a trip device for releasing said dog on the positive movement of the segment; with a rocking spring-actuated lever carrying a rod engaging the margin of the perforated ribbon and adapted to rock when the rod plunges through the perforations in said ribbon, beside the rocking lever a second spring-pressed lever, a rod connected therewith and adapted to engage the clutch lever to throw open the clutch on the completion by the ribbon of its predetermined extent of travel to the next perforation, and devices co-acting with said rocking lever for controlling the action of said second lever, substantially as described.

58. In combination with the ribbon rolls, spring actuated mechanism for operating said rolls, a rock-shaft for setting said mechanism, an electro-magnet for rocking said shaft to set the mechanism, a contact-block in electrical connection with the magnet, a swinging lever beside the contact-block, means for moving said lever in one direction from the rock-shaft, a spring for returning the lever, a contact finger mounted on said lever, means for throwing the finger into contact with the block when the lever descends, and means for snapping the finger away from the block when the lever ascends.

59. In combination, ribbon spools, a driving shaft, gearing between said shaft and spools, a spring-controlled mechanism for driving said shaft, a rock-shaft for cocking said driving mechanism, an electro-magnet for actuating said rock-shaft, a swinging lever operated from the rock-shaft, a contact-block beside said lever, a contact-finger pivoted on said lever, means for throwing the finger into contact with the block and closing the circuit through the magnet when the lever descends, and means for snapping the switch open when the lever ascends.

60. In combination, ribbon rolls, spring-actuated mechanism for operating said rolls, a dash-pot for regulating the action of the spring-actuated roll-operating mechanism, a rock-shaft for cocking said mechanism, an electro-magnet for rocking said shaft in one direction, a contact-block in electrical connection with the magnet, a swinging lever beside the contact block, means for moving said lever in one direction from the rock-shaft, a spring for returning the lever, a contact-finger mounted on said lever, means for throwing the finger into contact with the block when the lever descends, means for snapping the finger away from the block when the lever ascends, and a dash-pot for regulating and timing the return movement of the switch-lever.

61. In combination, ribbon spools, a driving shaft, independent sets of gearing between said shaft and spools, clutch-devices for locking either set of gearing to said shaft, spring-controlled mechanism for driving said shaft and mechanism for engaging and disengaging the driving mechanism from said shaft, a rock-shaft for cocking said driving mechanism, an electro-magnet for actuating said rock-shaft, a swinging lever operated from the rock-shaft, a contact-block beside said lever, a contact-finger pivoted on said lever, means for throwing the finger into contact with the block and closing the circuit through the magnet when the lever descends, and means for snapping the switch open when the lever ascends.

62. In combination, ribbon rolls, mechanism for actuating the same, and an electro-magnet controlling said mechanism, a swinging lever operated by said magnet in one direction, a contact block, a contact-spring bearing on said block, a contact-finger pivotally mounted on said lever, and means whereby said finger is thrown into contact with the block when the lever descends, and remains in contact until the lever ascends.

63. In combination, ribbon rolls, spring-actuated mechanism for operating said rolls, a rock-shaft for setting said mechanism, an electro-magnet for actuating said shaft in one direction, a swinging lever operated from said shaft, a contact-block, electrical connections between said contact-block and the electro-magnet, a contact-finger pivotally mounted on said lever, means for throwing the finger into contact with the block and closing the circuit with the magnet, and means for knocking the finger out of contact with the block to open the circuit after the magnet has rocked the shaft.

64. In combination, ribbon spools, a driving shaft, gearing between said shaft and spools, spring-actuated mechanism for driving said shaft, a rock-shaft for cocking said spring-actuated driving mechanism, an electro-magnet for actuating said rock-shaft, a swinging lever operated from the rock-shaft, a contact-block beside said shaft, a contact-finger pivoted on said lever, means for throwing the finger into contact with the block and closing the circuit through the magnet when the lever descends, and means for snapping the switch open when the lever ascends; with a dash-pot for regulating the operation of the spring-actuated driving mechanism, an air-dash-pot for regulating and timing the return movement of the switch-lever, and a spring for retracting the switch-lever when the current is broken, substantially as described.

65. In combination, ribbon spools, a driving shaft, independent sets of gearing between said shaft and spools, clutch-devices for locking either set of gearing to said shaft, spring-actuated mechanism for driving said shaft, mechanism for engaging and disengaging the driving mechanism from said shaft, a rock-shaft for cocking said driving mechanism, an electro-magnet for actuating said rock-shaft, a swinging lever operated from the rock-shaft, a contact-block beside said shaft, a contact-finger pivoted on said lever, means for throwing the finger into contact with the block and closing the circuit through the magnet when the lever descends, and means for snapping the switch open when the lever ascends; with a dash-pot for regulating the operation of the spring-actuated driving mechanism, an air-dash-pot for regulating and timing the return movement of the switch lever, and a spring for retracting the switch-lever when the current is broken, substantially as described.

66. In an indicator, the combination of a ribbon-roll, a perforated ribbon carried thereby, a driving shaft and auxiliary means for driving said roll, and means for rotating said shaft; with spring-actuated devices adapted to be mechanically set in the normal operation of said rotating means and mechanically controlled through the medium of the perforated ribbon for automatically uncoupling said shaft and rotating means at predetermined intervals in the operation of said indicator, substantially as described.

67. In an indicator, the combination of ribbon-rolls, a perforated ribbon carried thereby, a driving-shaft and connections for operating said rolls, a solenoid and connections for rotating said driving-shaft and an automatic time-switch for energizing said solenoid intermittently; with spring-actuated devices adapted to be mechanically set and sprung in the normal operation of said indicator for automatically coupling and uncoupling said shaft and its rotating means at times predetermined respectively by the automatic time-switch and the perforated ribbon, and a dash-pot and connections for governing the movement of said solenoid and connections, substantially as described.

68. In an indicator, the combination of a pair of ribbon-rolls arranged parallel one above the other, a perforated ribbon carried thereby, a roll-driving-shaft, means for rotating said shaft, devices for locking said rotating means to said shaft and for holding it in its locked position, unequal and dissimilar sets of gearings between said shaft and rolls adapted to give one roll when positively driven a force and a direction different from the force and the direction given the other roll when positively driven, a mechanically operated unlocking device adapted to unlock said rotating means from said driving-shaft, and a mechanically operated trip-mechanism mechanically controlled by the perforated ribbon and adapted to release said unlocking device for action at predetermined intervals, substantially as described.

69. In combination, an indicator ribbon having perforations and co-acting means for intermittently arresting said ribbon in its course at each perforation for the display of each sign on said ribbon, a pair of ribbon-rolls set one above the other for carrying said ribbon, a driving-shaft driven by equal, intermittent impulses for driving said rolls, means co-acting between said shaft and rolls designed to operate either roll positively one at a time in one direction and adapted to differentiate the torque of said rolls so that the roll which winds the ribbon upward applies to the ribbon a greater force than does the roll which winds the ribbon downward; with means whereby when either roll is being positively driven by said shaft the other is trailing, mechanism for actuating said shaft, and spring-pressed devices mechanically set and operated by said mechanism and mechanically controlled through the medium of the perforated ribbon for automatically unlocking said driving-shaft from either roll when a predetermined part of the perforated ribbon has been wound upon that roll and for likewise locking said shaft to the other roll now to be driven.

70. In combination, an indicator ribbon having perforations $s'$ therein near the ends thereof; ribbon rolls for winding said ribbon in either direction; devices mechanically controlled by said ribbon through the perforations $s'$, and designed for mechanical actuations in all their movements, and adapted to control automatically and mechanically the direction of rotation of said rolls, so that the rolls shall reverse the movement of said ribbon at each of the perforations $s'$; means adapted to rotate the rolls in either direction, and incidentally to operate said devices in co-action with said ribbon and perforations; a governor in operative connection with said devices, and means to prevent too rapid movement or injurious concussion of parts therein, substantially as described.

71. In combination, an indicator ribbon having signs thereon and perforations $s$ in one side-margin opposite said signs; and perforations $s'$ in the other side-margin of said ribbon opposite the first and the last of said signs; ribbon rolls for winding said ribbon in either direction, mechanism mechanically controlled by said ribbon with its perforations $s$ and actuated mechanically in all its movements and adapted to control mechanically the movements of said rolls so that, as they rotate in either direction, they shall wind the ribbon thereon intermittently and stop it automatically at each of said perforations *s* opposite each of said signs; devices mechanically controlled by said ribbon with its perforations *s'* and actuated mechanically in all their movements and adapted to control automatically and mechanically the direction of rotation of said rolls so that they shall reverse the movement of said ribbon at each of the perforations *s'*; means adapted to mechanically operate said mechanism and said devices and to rotate said rolls in either direction; and a governor in operative connection with said mechanism, devices, and means, to prevent too rapid action or other injurious effects therein, substantially as described.

72. In combination, an indicator ribbon having signs thereon, and perforations *s* in one side-margin of said ribbon opposite each of said signs; and perforations *s'* in the other side-margin of said ribbon opposite the first and the last of said signs; ribbon-rolls for winding said ribbon in either direction; mechanism mechanically co-acting with said ribbon and perforations *s* and actuated mechanically in all its movements and adapted to control mechanically the movements of said rolls so that, as they rotate in either direction, they shall wind the ribbon thereon intermittently and stop it automatically at each of said perforations *s* opposite each of said signs; devices co-acting mechanically with said ribbon and the perforations *s'* and actuated mechanically in all their movements and adapted to control automatically and mechanically the direction of rotation of said rolls so that they shall reverse the movement of said ribbon at each of the perforations *s'*; a spring motor and auxiliary parts adapted to rotate said rolls in either direction; means for setting said spring motor and for mechanically operating said mechanism and said devices in co-action with the perforated ribbon for the performance of their respective cycles of operations as seen in the display of each sign on said ribbon and in the reversing movement at each end of said ribbon, so that as long as motive power is properly applied to said means, said ribbon will repeatedly travel back and forth displaying with intermittent rests all its signs, one at a time, and automatically reverse at the end ones; and a governor in operative connection with said mechanism, devices, spring motor and auxiliary parts and setting means to prevent too rapid movement of the parts therein, substantially as described.

73. In combination, an indicator ribbon having signs thereon, and perforations *s* in one side-margin of said ribbon opposite each of said signs; and perforations *s'* in the other side-margin of said ribbon opposite the first and the last of said signs; ribbon-rolls for winding said ribbon in either direction; mechanism co-acting mechanically with said ribbon and the perforations *s*, and actuated mechanically in all its movements, and adapted to control mechanically the movements of said rolls so that, as they rotate in either direction they shall wind the ribbon thereon intermittently and stop it automatically at each of said perforations *s* opposite each of said signs; devices co-acting mechanically with said ribbon and the perforations *s'*, and actuated mechanically in all their movements, and adapted to control automatically and mechanically the direction of rotation of said rolls so that they shall reverse the movement of said ribbon at each of the perforations *s'*, a spring motor and auxiliary means adapted to rotate said rolls in either direction; a rock-shaft and connections adapted to set said spring motor and, in co-action with said ribbon, to operate said mechanism and said devices for the completion of their respective cycles of work; an electric motor adapted to rock said rock-shaft and connections for the performance of their respective functions; and a governor in operative connection with said mechanism, devices, spring motor and auxiliary means, rock-shaft and connections, and also with said electric motor, to prevent too rapid movement or injury of the parts therein, substantially as described.

74. In combination, an indicator ribbon having signs thereon, and perforations in one side-margin of said ribbon opposite each of said signs, and perforations *s'* in the other side-margin of said ribbon opposite the first and the last of said signs; ribbon-rolls for winding said ribbon in either direction; mechanism co-acting mechanically with said ribbon and the perforations *s*, and actuated mechanically in all its movements, and adapted to control mechanically the movements of said rolls so that, as they rotate in either direction, they shall wind the ribbon thereon intermittently and stop it automatically at each of said perforations *s* opposite each of said signs; devices co-acting mechanically with said ribbon and the perforations *s'*, and actuated mechanically in all their movements, and adapted to control automatically and mechanically the direction of rotation of said rolls, so that they shall reverse the movement of said ribbon at each of the perforations *s'*, a spring motor and auxiliary means adapted to rotate said rolls in either direction; a rock-shaft and connections adapted to set said spring motor, and, in co-action with said perforated ribbon, to operate said mechanism and said devices for the completion of their respective cycles of work; a reciprocating electric motor for rocking said rock-shaft and connections for the performance of their respective functions; a dash-pot in operative connection with said mechanism, devices, spring motor and auxiliary means, rock-shaft and -connections, and also with said electric motor, to govern the rapidity of movement of their parts; and means adapted to act automatically at predetermined intervals in closing and opening an electric circuit through said reciprocating motor, substantially as described.

75. In combination, a sign-carrying-ribbon having along one longitudinal line perforations $s$ for arresting the ribbon with each sign successively in a predetermined position, and along another longitudinal line perforations $s'$ for controlling the reversal of the ribbon movement at predetermined intervals; ribbon-rolls for winding said ribbon in either direction; mechanism co-acting mechanically with said ribbon and the perforations $s$, and actuated mechanically in all its movements, and adapted to control mechanically the movements of said rolls so that, as they rotate in either direction, they shall wind the ribbon thereon intermittently and stop it automatically at intervals determined by the position of said perforations $s$; devices co-acting mechanically with said ribbon and the perforations $s'$, and actuated mechanically in all their movements, and adapted in normal operation to control automatically and mechanically the direction of rotation of said rolls, so that they shall reverse the movement of said ribbon successively at intervals determined by the position of the perforations $s'$; a driving-shaft with two separate sets of gearing for alternate connection therewith adapted to drive said rolls positively one at a time in different directions; a spring motor and auxiliary parts adapted to rotate said shaft in one direction; a rock-shaft and connections adapted to set said spring motor and in co-action with said perforated ribbon to operate said controlling mechanism and said controlling devices to complete their respective cycles of operation; an electro-magnet adapted to rock said rock-shaft and connections for the performance of their respective functions; a dash-pot in operative connection with said mechanism, devices, spring-motor and auxiliary parts, rock-shaft and connections, and also with said electro-magnet to properly govern the movements of their parts; and spring-pressed means incidentally set by the action of said rock-shaft, and adapted to act automatically in opening and closing an electric circuit through said electro-magnet at predetermined intervals, substantially as described.

76. In an indicator, the combination of ribbon-rolls, a perforated ribbon carried thereby, driving means for said rolls, and spring-actuated devices co-acting mechanically with said driving means and perforated ribbon and adapted to act mechanically to reverse the moving direction of said ribbon at predetermined intervals.

77. In an indicator, the combination of ribbon-rolls, a perforated ribbon carried thereby, spring-pressed means for driving said rolls, spring-pressed devices mechanically co-acting with said driving means and the perforated ribbon and adapted to act mechanically to reverse said rolls at predetermined intervals, with a dash-pot for regulating the action of said means and devices, and means for actuating said driving means and said devices.

78. In an indicator, the combination of an indicator casing providing with a hinged front door, a pair of ribbon-rolls, a pair of sliding spring-pressed stub-shafts adapted to detachably lock said rolls in their operative position and to rotate them, means for driving said stub-shafts, openings in one end of said casing opposite said stub-shafts to allow manipulation of said stub-shafts, and devices co-acting with said door for automatically closing said openings to prevent the manipulation of said stub-shafts when the front door of casing is closed normally, substantially as described.

79. In combination, a casing having a swinging front door, ribbon-rolls, also roll-shafts, and actuating mechanism for said rolls in said casing, said casing having openings in its end opposite said roll-shafts; with shutters for closing said openings, and pivoted spring-pressed levers carrying said shutters, substantially as described.

80. In combination, a pair of ribbon-rolls, a roll-driving shaft therefor, adapted to rotate intermittently with equal impulses and in only one direction while driving, unequal and dissimilar sets of gearing between said shaft and rolls adapted to drive one roll at a time and to give to either roll when positively driven a force and a direction different from the force and direction given the other roll when positively driven.

In testimony that we claim the foregoing as our own, we affix our signatures in presence of two witnesses.

JOHN J. ROBERTS.
JEFFERSON D. KEEN.

In presence of—
ARTHUR E. DOWELL,
JAMES R. MANSFIELD.